(12) United States Patent
Nakao et al.

(10) Patent No.: US 7,716,837 B2
(45) Date of Patent: May 18, 2010

(54) CONSTANT VELOCITY JOINT AND METHOD OF MANUFACTURING THE SAME

(75) Inventors: Shouichi Nakao, Utsunomiya (JP); Tsutomu Kawakatsu, Utsunomiya (JP); Masanori Kosugi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 11/579,345

(22) PCT Filed: May 17, 2005

(86) PCT No.: PCT/JP2005/008942

§ 371 (c)(1),
(2), (4) Date: Nov. 2, 2006

(87) PCT Pub. No.: WO2005/111450

PCT Pub. Date: Nov. 24, 2005

(65) Prior Publication Data
US 2008/0311998 A1      Dec. 18, 2008

(30) Foreign Application Priority Data

May 18, 2004 (JP) .............................. 2004-148232
Jun. 17, 2004 (JP) .............................. 2004-179334

(51) Int. Cl.
*B21K 1/76* (2006.01)
(52) U.S. Cl. .................. 29/898.062; 464/905
(58) Field of Classification Search .................. 464/111, 464/132, 905; 29/522.1, 898.062, 898.07; 206/318
See application file for complete search history.

(56) References Cited

U.S. PATENT DOCUMENTS

| | | | |
|---|---|---|---|
| 3,596,478 A * | 8/1971 | Komuzin ..................... 464/111 |
| 4,166,660 A * | 9/1979 | Murphy .............. 29/898.062 X |
| 5,989,124 A | 11/1999 | Goto et al. |
| 7,137,895 B2 | 11/2006 | Ishijima et al. |
| 7,371,179 B2 * | 5/2008 | Kawakatsu et al. ......... 464/111 |

FOREIGN PATENT DOCUMENTS

| | | |
|---|---|---|
| JP | 34-6002 | 7/1959 |
| JP | 56-146637 A | 11/1981 |
| JP | 1-138531 U | 9/1989 |

(Continued)

OTHER PUBLICATIONS

Universal Joint and Driveshaft Design Manual, AE-7, The Society of Automotive Engineers Inc., Warrendale, PA, pp. 137 and 138, TJ1079.S62 1979.*

*Primary Examiner*—Greg Binda
(74) *Attorney, Agent, or Firm*—Birch, Stewart, Kolasch & Birch, LLP

(57) ABSTRACT

A constant velocity joint, wherein all of those rolling elements excluding a plurality of rolling elements are divided into a plurality of rolling element groups and arranged along the inner diameter part of a roller member. The excluded plurality of rolling elements are dispersed in first to third cam grooves at intervals in the circumferential direction. When the rolling elements are pressed in the radial outer direction by the first to third pressing faces of a cam rotating in the arrow A direction, they are simultaneously press-fitted into first to third clearances between the rolling elements from the side of the inner diameter part of the roller member.

6 Claims, 21 Drawing Sheets

FOREIGN PATENT DOCUMENTS

| | | |
|---|---|---|
| JP | 2-9329 U | 1/1990 |
| JP | 2-35221 A | 2/1990 |
| JP | 7-53865 Y2 | 12/1995 |
| JP | 2594603 B2 | 12/1996 |
| JP | 10-184717 A | 7/1998 |
| JP | 2003-28186 A | 1/2003 |
| JP | 2004-68838 A | 3/2004 |
| JP | 3560965 B1 | 6/2004 |
| JP | 2005-220955 A | 8/2005 |
| KR | 2003-0006840 A | 1/2003 |
| KR | 2003-0067340 A | 8/2003 |
| KR | 10-2004-0036572 A | 4/2004 |

* cited by examiner (COMPARATIVE EXAMPLE)

(PRESENT EMBODIMENT)

d2<d1

PRIOR ART

CONSTANT VELOCITY JOINT AND METHOD OF MANUFACTURING THE SAME

TECHNICAL FIELD

The present invention relates to a constant-velocity joint for connecting a transmission shaft to another transmission shaft in an automotive driveline, for examples and a method of manufacturing such a constant-velocity joint.

BACKGROUND ART

Heretofore, automotive drivelines employ a constant-velocity joint for connecting a transmission shaft to another transmission shaft and transmitting rotational power to the axles.

One conventional constant-velocity joint, whose technical concept is disclosed in Japanese Laid-Open Patent Publication No. 10-184717, has, as shown in FIG. 21 of the accompanying drawings, a roller 1 having a cylindrical inner circumferential wall surface 2 and a pair of flanges (not shown) mounted on the respective axial ends of the cylindrical inner circumferential wall surface 2 for preventing rolling elements 3 (rolls, needles, or the like) from being dislodged. The constant-velocity joint is assembled as follows: A plurality of rolling elements 3, whose number is one less than the total number of rolling elements 3 to be finally mounted, is arrayed between the flanges on the cylindrical inner circumferential wall surface 2. The dimensions of the cylindrical inner circumferential wall surface 2 and the rolling elements 3 are selected such that the minimum distance d2 between two rolling elements 3 on the ends of the array is smaller than the diameter d1 of a rolling element 3a which is to be added finally between those two rolling elements 3 (d2<d1). The difference between the distance d2 and the diameter d1 (d1−d2) serves as an interference ranging from several μm to several tens μm. Then, the rolling element 3a is finally pressed in between the two rolling elements 3 radially outwardly toward the cylindrical inner circumferential wall surface 2, thus installing the rolling elements 3 on the cylindrical inner circumferential wall surface 2.

The above process of arraying the rolling elements 3 along the cylindrical inner circumferential wall surface 2 of the roller 1 is referred to as a keystone process. The keystone process allows the roller 1 and the rolling elements 3 to be integrally combined as an inseparable assembly which is assembled on a leg shaft.

If the process of assembling the rolling elements 3 as disclosed in Japanese Laid-Open Patent Publication No. 10-184717 is applied and the rolling elements 3, whose number is one less than the total number of rolling elements 3 to be finally mounted, are to be arrayed successively one by one between the flanges along the cylindrical inner circumferential wall surface 2 of the circumferentially rotating roller 1, not manually, but by a mechanism (not shown) such as a cam or the like, then circumferential clearances may occur between the rolling elements 3 arrayed along the cylindrical inner circumferential wall surface 2, or clearances developed between the rolling elements 3 arrayed along the cylindrical inner circumferential wall surface 2 may become irregular.

Even if the final rolling element 3a is pressed in between the two rolling elements 3 radially outwardly toward the cylindrical inner circumferential wall surface 2, since the actual interference is greater than the preset interference due to the clearances, it is difficult to press the final rolling element 3a neatly into place or the rolling elements 3, 3a are deformed when the final rolling element 3a is forcibly pressed into place.

According to the process of assembling rolling elements as disclosed in Japanese Laid-Open Patent Publication No. 10-184717, when the final rolling element 3a is pressed into the gap between the two rolling elements 3, as shown in FIG. 21, the radially outward pressing force concentrates on the final rolling element 3a. Therefore, a holder 4 needs to be positioned on the outer circumferential surface of the roller 1 for bearing the radially outward pressing force acting on the final rolling element 3a. As a result, the number of parts making up an assembling apparatus that performs the process of assembling rolling elements is increased, resulting in an increase in the cost to manufacture the constant-velocity joint.

There have heretofore been employed various bearings to meet various load requirements including different load magnitudes, directions, and rotational speeds. Those various bearings are generally classified into radial bearings and thrust bearings according to the directions of loads to be borne. One of the radial bearings for bearing radial loads is known as a keystone bearing.

The keystone bearing is a radial bearing for use under heavy loads, and has a basic structure including an annular array of rolling elements in the form of cylindrical rolls arranged fully circumferentially in contact with the inner surface of an outer race. The keystone bearing does not require a retainer for preventing the cylindrical rolls from being dislodged. The keystone bearing has a member for keeping the rolling elements within the outer race against dislodgment during operation, the member having an inside diameter smaller than a minimum dimension from which the rolling elements would be dislodged radially inwardly.

A conventional keystone bearing as disclosed in Japanese Laid-Open Utility Model Publication No. 2-9329 is also illustrated in FIG. 21 of the accompanying drawings. As shown in FIG. 21, the keystone bearing includes an outer race 1 having a cylindrical inner circumferential wall surface 2 and a pair of flanges (not shown) mounted on the respective axial ends of the cylindrical inner circumferential wall surface 2 for preventing rolling elements 3 (rolls, needles, or the like) from being dislodged. The constant-velocity joint is assembled as follows: A plurality of rolling elements 3, whose number is one less than the total number of rolling elements 3 to be finally mounted, is arrayed between the flanges on the cylindrical inner circumferential wall surface 2. The dimensions of the cylindrical inner circumferential wall surface 2 and the rolling elements 3 are selected such that the minimum distance d2 between two rolling elements 3 on the ends of the array is smaller than the diameter d1 of a rolling element 3a which is to be added finally between those two rolling elements 3 (d2<d1). Then, the rolling element 3a is finally pressed in between the two rolling elements 3 radially outwardly toward the cylindrical inner circumferential wall surface 2, thus installing the rolling elements 3 on the cylindrical inner circumferential wall surface 2. Japanese Utility Model Publication No. 7-53865 discloses a bearing rolling element assembling apparatus which employs an eccentric cam.

DISCLOSURE OF THE INVENTION

Problems to be Solved by the Invention

It is a general object of the present invention to provide a constant-velocity joint which allows a plurality of rolling elements to be smoothly press-fitted into gaps even if circumferential clearances occur between the rolling elements arrayed along an inner circumferential surface of a roller or circumferential clearances developed between the rolling elements are irregular, and a method of manufacturing such a constant-velocity joint.

Another object of the present invention is to provide a constant-velocity joint which is capable of distributing pressing forces applied to press-fit a plurality of rolling elements to allow the rolling elements to be assembled efficiently for manufacturing the constant-velocity joint less costly, and a method of manufacturing such a constant-velocity joint.

The above and other objects, features, and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
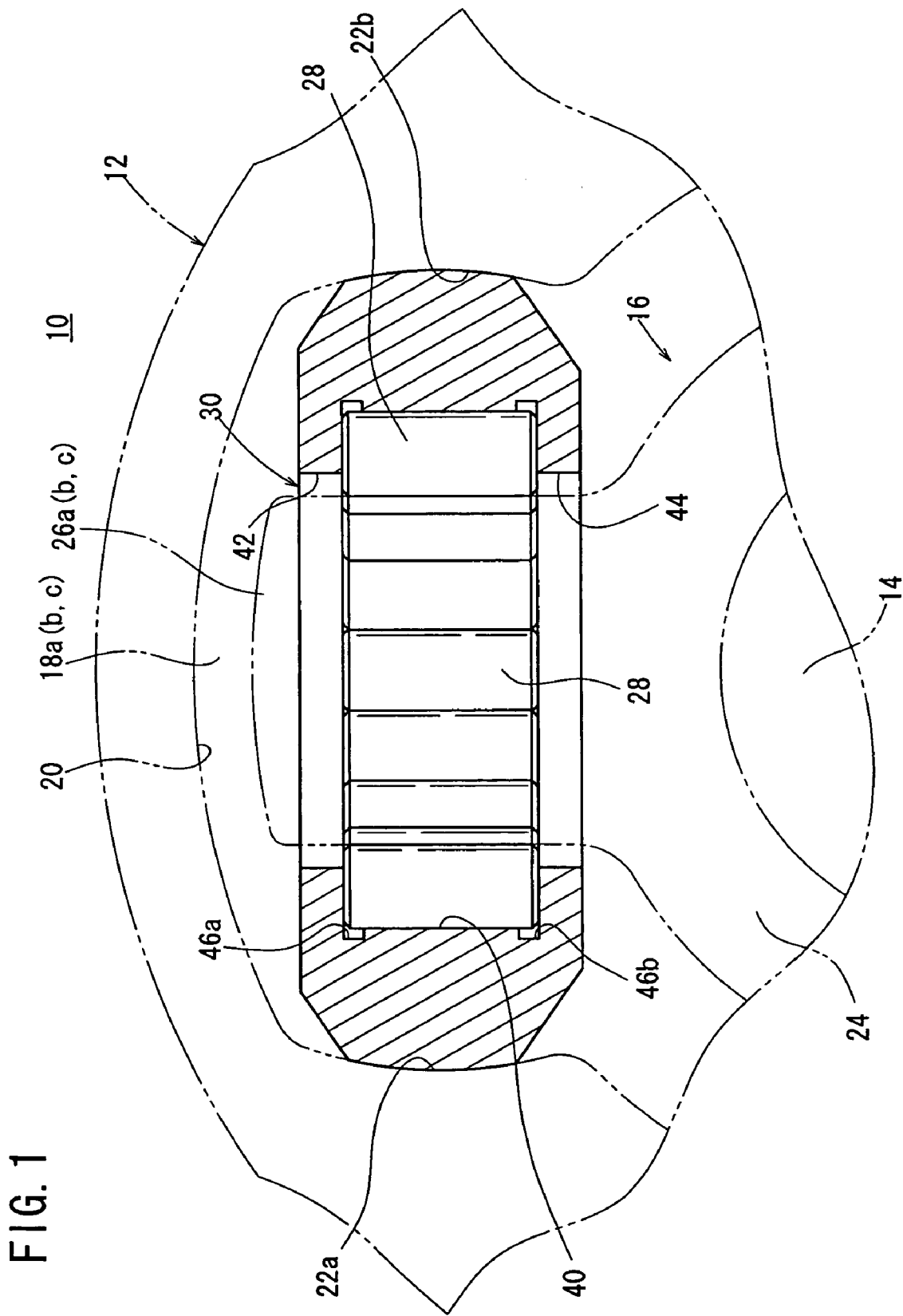
FIG. 1 is an enlarged fragmentary vertical cross-sectional view of a constant-velocity joint, taken along a plane perpendicular to the axis of the constant-velocity joint, which is manufactured by a method of manufacturing a constant-velocity joint according to an embodiment of the present invention.

FIG. 1 shows a tripod constant-velocity joint 10 which is manufactured by a method of manufacturing a constant-velocity joint according to an embodiment of the present invention. As shown in FIG. 1, the tripod constant-velocity joint 10 basically comprises a tubular outer cup (outer member) 12 integrally coupled to an end of a first shaft (not shown) and having an opening, and an inner member 16 fixed to an end of a second shaft 14 and housed in the opening of the outer cup 12.

As shown in FIG. 1, the outer cup 12 has three guide grooves 18a through 18c defined in an inner wall surface thereof. The guide grooves 18b, 18c are omitted from illustration in FIG. 1. The guide grooves 18a through 18c extend in the axial direction of the outer cup 12 and are angularly spaced at angular intervals of 120° around the axis of the outer cup 12. Each of the guide grooves 18a through 18c comprises a ceiling 20 having an arcuate cross section and two sliding surfaces 22a, 22b disposed on respective opposite sides of the ceiling 20 in confronting relation to each other and each having an arcuate cross section.

The inner member 16 comprises a ring-shaped spider 24 fitted over the second shaft 14. The spider 24 has three integral trunnions 26a through 26c projecting radially outwardly from an outer circumferential surface thereof into the respective guide grooves 18a through 18c and angularly spaced at angular intervals of 120° around the axis of the spider 24. The trunnions 26b, 26c are omitted from illustration in FIG. 1.

A ring-shaped roller 30 is fitted over each of the trunnions 26a through 26c with a plurality of rolling elements 28 interposed therebetween. The rolling elements 28 may comprise roll bearing elements such as needles, rolls, or the like.

Figure 2:
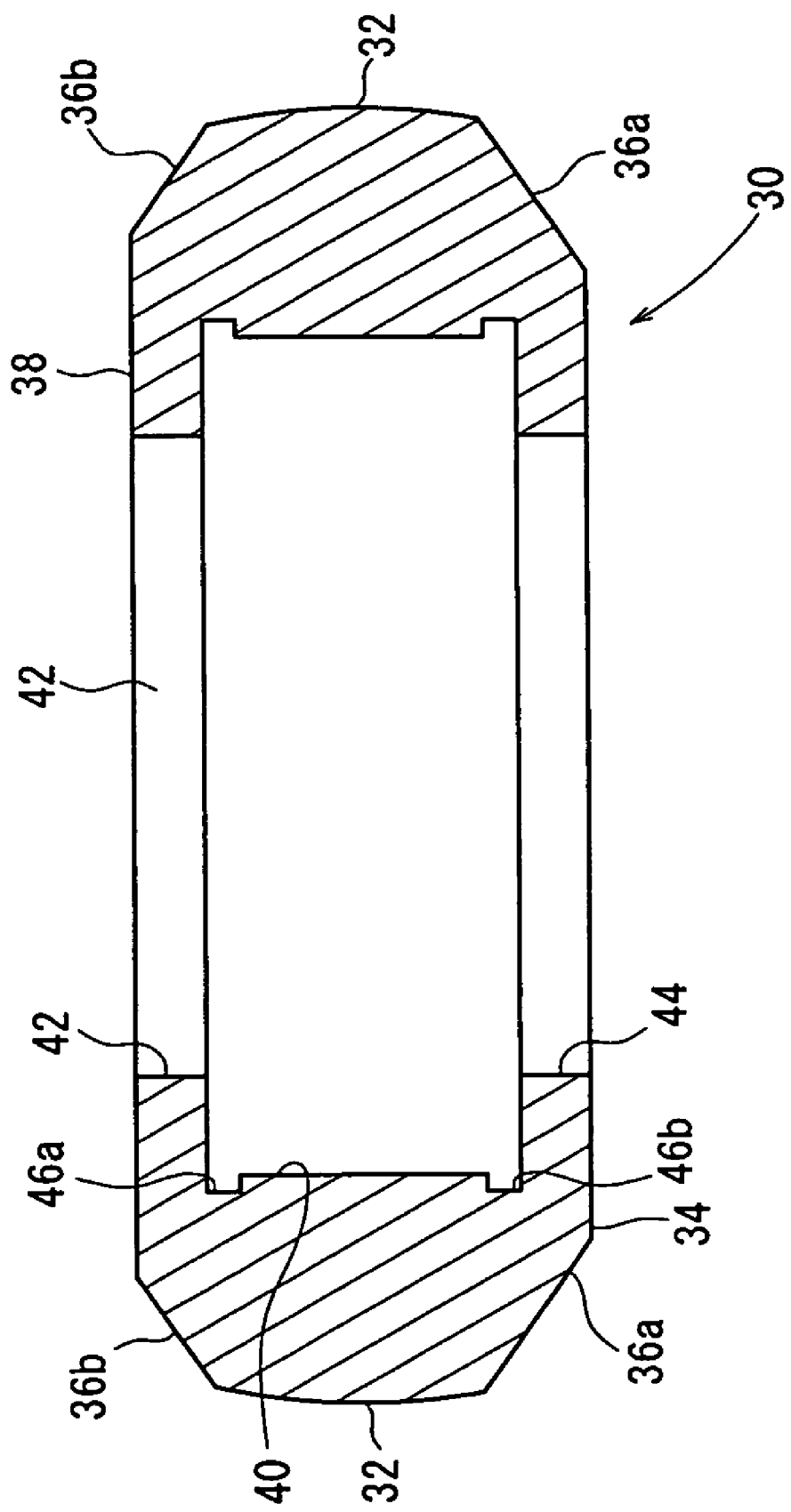
FIG. 2 is a vertical cross-sectional view of a roller of the constant-velocity joint shown in FIG. 1.

As shown in FIG. 2, the roller 30 has an outer circumferential surface comprising an arcuate surface 32 complementary in cross-sectional shape to the sliding surfaces 22*a*, 22*b* for face-to-face contact with the sliding surfaces 22*a*, 22*b*, a first annular slanted surface 36*a* extending from the arcuate surface 32 into a first end face 34 of the roller 30, and a second annular slanted surface 36*b* extending from the arcuate surface 32 into a second end face 38 of the roller 30 which is axially opposite to the first end face 34.

The roller 30 has an inner circumferential wall surface 40 having a constant diameter and functioning as a rolling surface with which the rolling elements 28 is held in rolling engagement. The roller 30 also has an annular first flange 42 integrally projecting radially inwardly a predetermined distance from an upper portion (an end) of the inner circumferential wall surface 40, and an annular second flange 44 integrally projecting radially inwardly a predetermined distance from a lower portion (another end) of the inner circumferential wall surface 40 and axially opposite to and spaced from the first flange 42. The rolling elements 28 are mounted on the inner circumferential wall surface 40 of the roller 30 and vertically held in position between the first flange 42 and the second flange 44.

In FIGS. 1 and 2, the first flange 42 and the second flange 44 are shown as being integrally formed with the roller 30. However, the rolling elements 28 may be vertically held in position on the inner circumferential wall surface 40 by holder mechanisms such as washers or the like (not shown) mounted in annular grooves (not shown) defined in the inner circumferential wall surface 40. One holder mechanism may be positioned in one of upper and lower positions on the inner circumferential wall surface 40, or two holder mechanisms may be positioned in the respective upper and lower positions on the inner circumferential wall surface 40.

As shown in FIG. 2, annular grooves 46*a*, 46*b* are defined at boundaries between the inner circumferential wall surface 40 and the first and second flanges 42, 44. The annular grooves 46*a*, 46*b* function as lubricant reservoirs for holding a lubricant such as a grease or the like when the inner circumferential wall surface 40 is coated with the lubricant.

The rolling elements 28 are disposed on the inner circumferential wall surface 40 substantially parallel to each other in the circumferential direction of the roller 30. The rolling elements 28 are retained against dislodgment from the inner circumferential wall surface 40 by the first and second flanges 42, 44 projecting radially inwardly from the axially opposite ends of the inner circumferential wall surface 40. The rolling elements 28 have substantially the same diameter and substantially the same shape. The trunnion 26*a* (26*b*, 26*c*) is in the form of a cylindrical body having a constant outside diameter.

The constant-velocity joint 10 which is manufactured by the method of manufacturing a constant-velocity joint according to the embodiment of the present invention is basically constructed as described above. Operation and advantages of the constant-velocity joint 10 will be described below.

A first assembling process of assembling the constant-velocity joint 10, i.e., a process of installing the rolling elements 28 onto the inner circumferential wall surface 40 of the roller 30, will be described below.

All (a predetermined number of) rolling elements 28, except three rolling elements 28, are placed onto the inner circumferential wall surface 40. At this time, as shown in FIG. 3, a rolling element loading apparatus is used which comprises a cam 52 having first through third cam grooves 48*a* through 48*c* that are circumferentially angularly spaced at equal intervals and first through third pressing surfaces 50*a* through 50*c* of arcuate cross section that are contiguous to the respective first through third cam grooves 48*a* through 48*c*, the cam 52 being rotatable about its own axis in the direction indicated by the arrow A by a rotary actuator (not shown), and a turning mechanism such as a stepping motor or the like (not shown) for angularly displacing the roller 30 intermittently a certain angle in the direction indicated by the arrow B depending on how rolling elements 28 are loaded.

Figure 3:
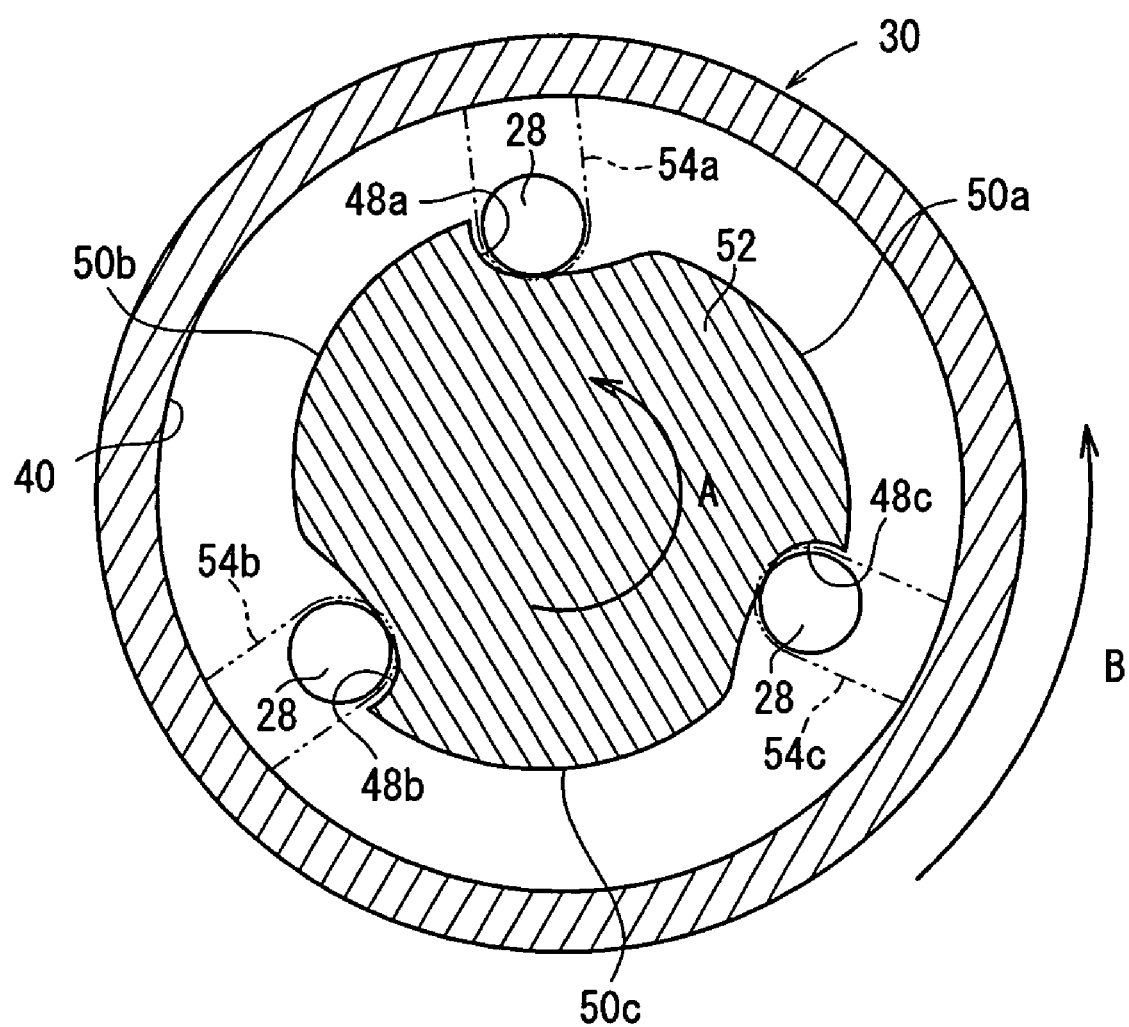
FIG. 3 is a transverse cross-sectional view illustrative of a first assembling process for assembling a plurality of rolling elements onto an inner circumferential wall surface of the roller.

As shown in FIG. 3, three rolling elements 28 delivered through a plurality of chutes (not shown) are substantially simultaneously inserted respectively into the first through third cam grooves 48*a* through 48*c*. Then, the cam 52 is rotated in the direction indicated by the arrow A to cause the first through third pressing surfaces 50*a* through 50*c* that are contiguous to the respective first through third cam grooves 48*a* through 48*c* to press the three rolling elements 28 radially outwardly substantially simultaneously to the inner circumferential wall surface 40 of the roller 30.

When the three rolling elements 28 are pressed radially outwardly by the first through third pressing surfaces 50*a* through 50*c*, the three rolling elements 28 are displaced smoothly radially outwardly as they are guided by respective guide grooves 54*a* through 54*c* that are defined in a stage (not shown) on which the roller 30 is placed.

The inner circumferential wall surface 40 has been coated with a lubricant such as a grease or the like in advance. The rolling elements 28 pressed against the inner circumferential wall surface 40 are held on the inner circumferential wall surface 40 by the grease.

Figure 4:
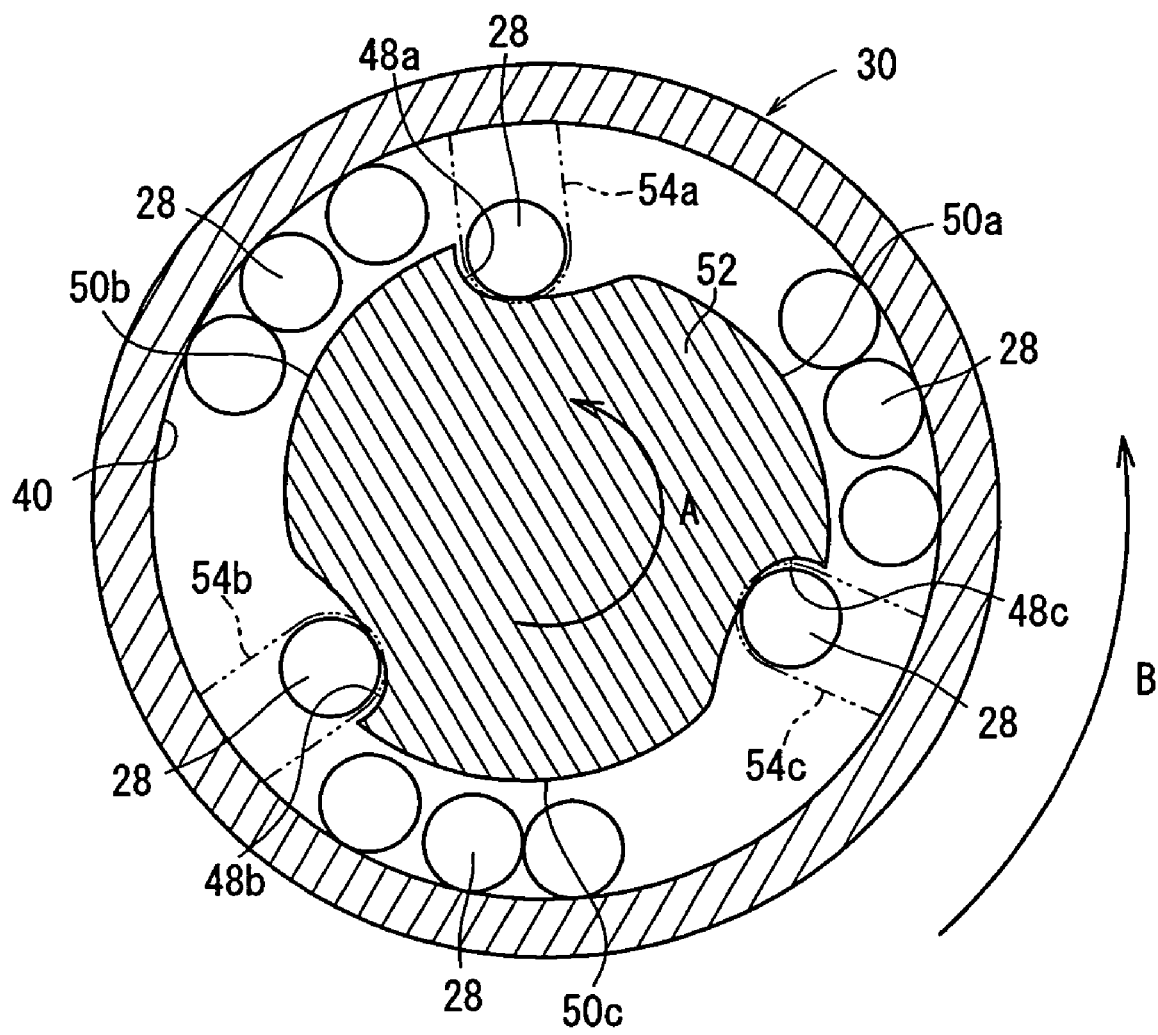
FIG. 4 is a transverse cross-sectional view showing the manner in which rolling elements are arranged on the inner circumferential wall surface of the roller by a cam.
Figure 5:
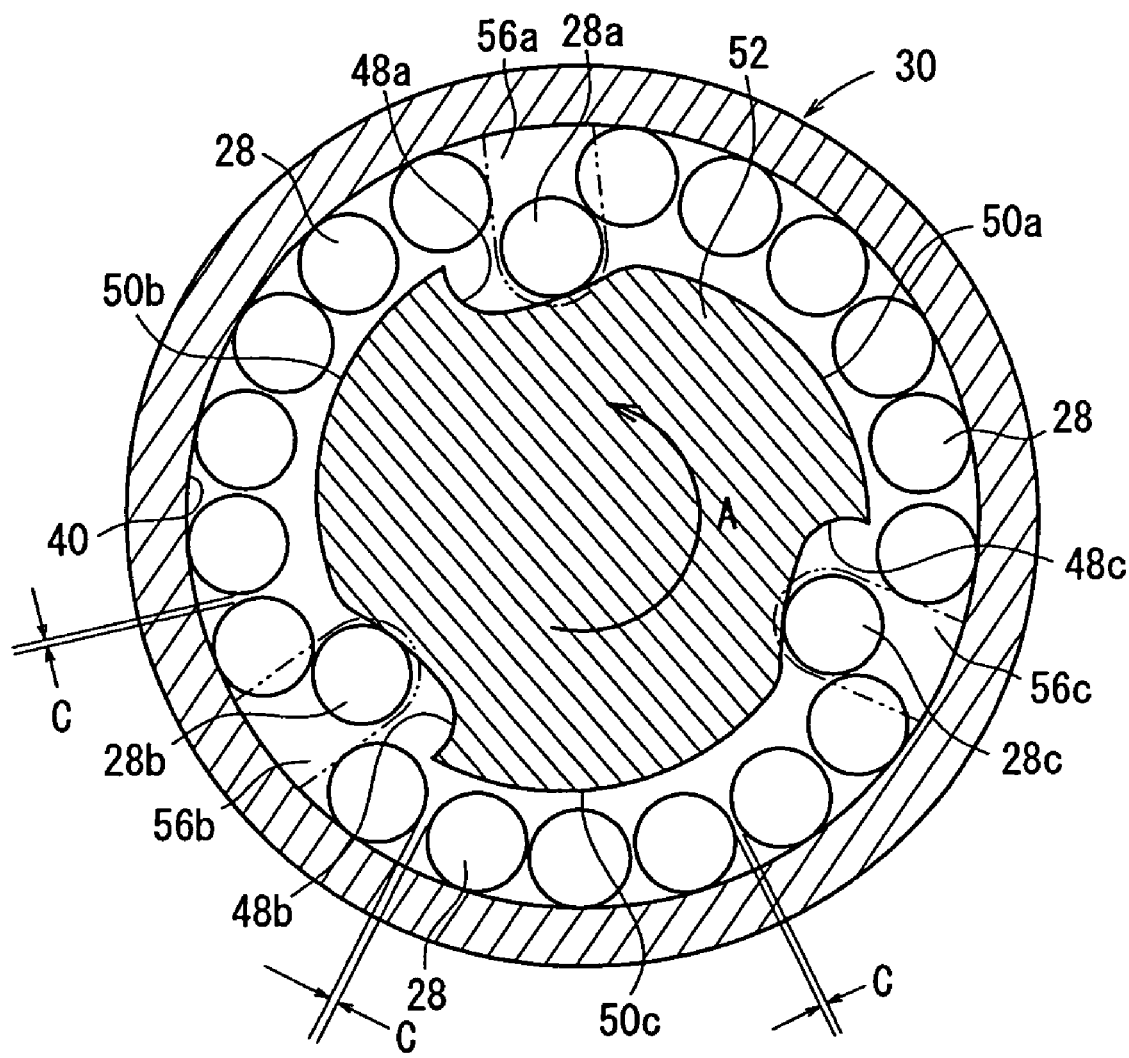
FIG. 5 is a transverse cross-sectional view showing the manner in which final three rolling elements are loaded into respective cam grooves.

After the three rolling elements 28 are loaded on the inner circumferential wall surface 40, the turning mechanism is actuated to turn the roller 30 the certain angle in the direction indicated by the arrow B, and another set of rolling elements 28 is introduced into the roller 30. Such an assembling cycle is repeated until all the rolling elements 28 except three rolling elements 28*a*, 28*b*, 28*c* are loaded on the inner circumferential wall surface 40 (see FIGS. 4 and 5). As shown in FIG. 5, the rolling elements 28 that are loaded on the inner circumferential wall surface 40 are divided into three rolling element groups by first, second, and third gaps 56*a*, 56*b*, 56*c* that are circumferentially spaced. Stated otherwise, the first, second, and third gaps 56*a*, 56*b*, 56*c* are defined between the rolling elements 28 at the ends of the three arcuate rolling element groups of rolling elements 28.

As shown in FIG. 5, circumferential clearances C occur between the adjacent rolling elements of the rolling element groups. These circumferential clearances C are formed irregularly at random.

All the rolling elements 28 except three rolling elements 28*a*, 28*b*, 28*c* may be loaded altogether by a rolling element loading apparatus (not shown). The rolling elements 28 that are loaded on the inner circumferential wall surface 40 may be held in place by the lubricant, or by other mechanical or physical holding means. For example, the rolling elements 28 may be held in place by magnetic forces of a magnet (not shown). The rolling elements 28 may be loaded by rotating only the cam 52 in the direction indicated by the arrow A while the roller 30 is being kept at rest.

Figure 6:
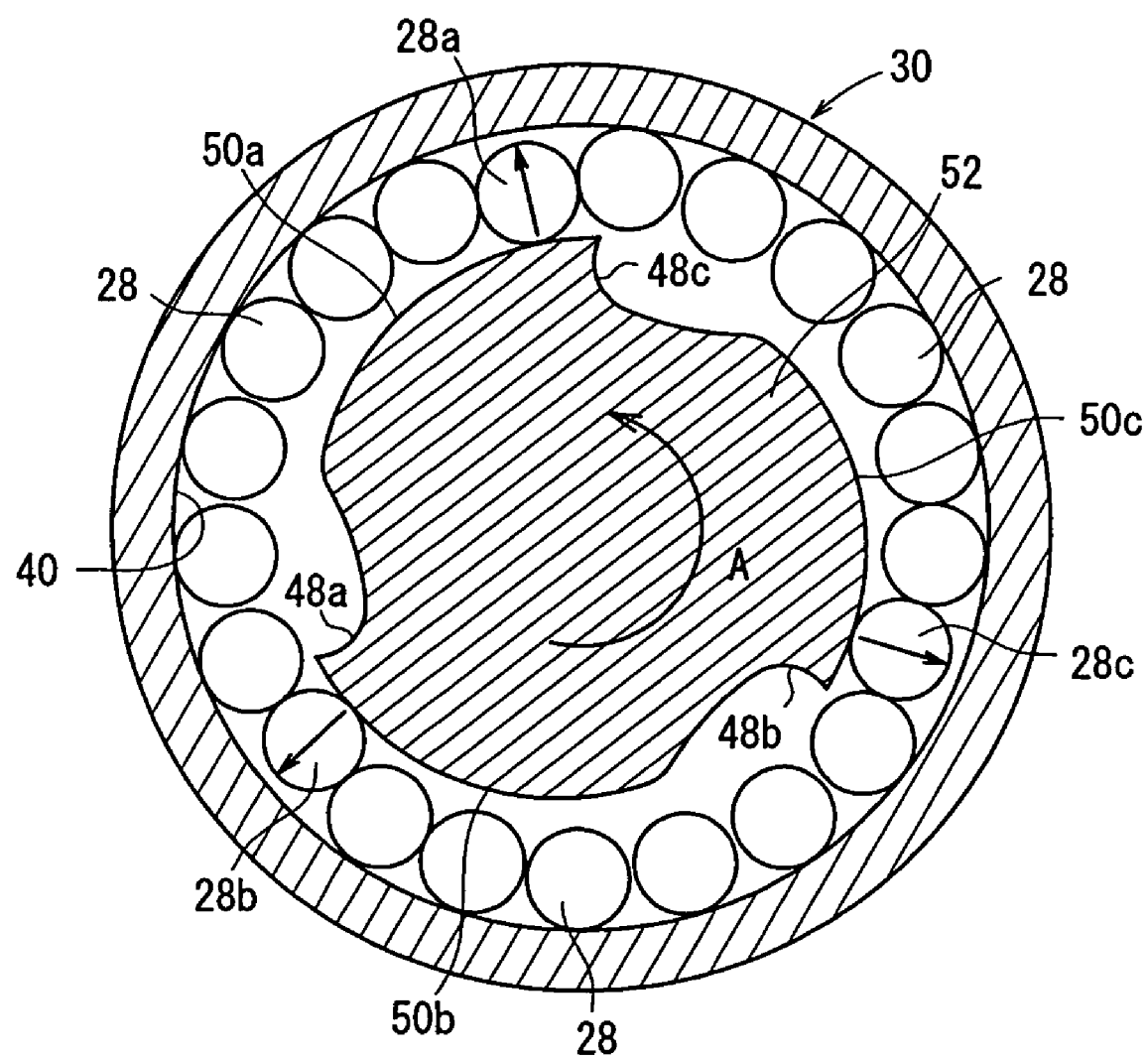
FIG. 6 is a transverse cross-sectional view showing the manner in which the final three rolling elements are press-fitted into gaps by pressing surfaces of the cam.
Figure 7:
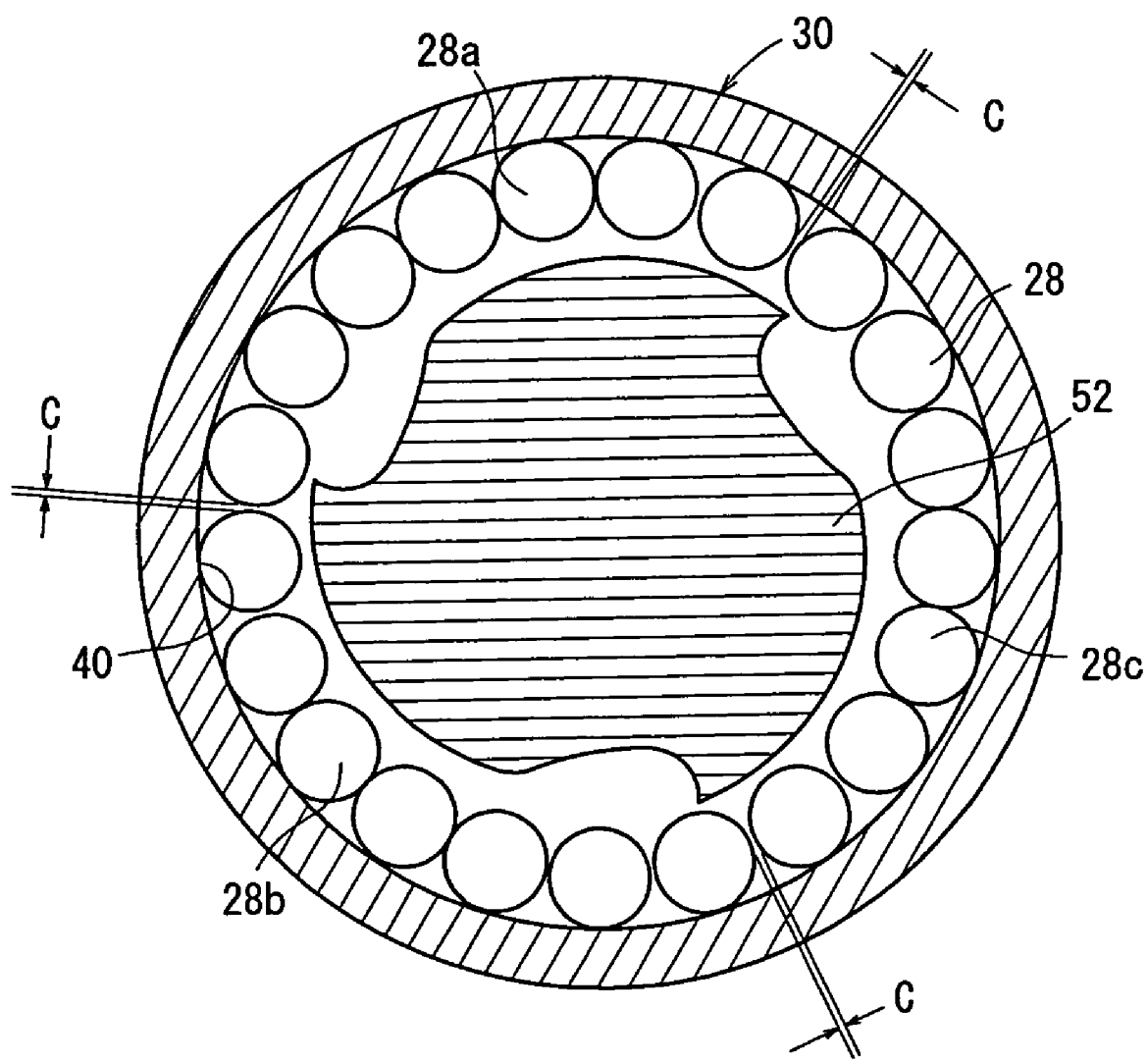
FIG. 7 is a transverse cross-sectional view showing the manner in which a plurality of rolling elements are arrayed on the inner circumferential wall surface of the roller after the final three rolling elements are press-fitted into the gaps.

After all the rolling elements 28 except three rolling elements 28*a*, 28*b*, 28*c* (though 21 rolling elements 28 are shown in FIGS. 6 and 7, the number is not limitative) are arrayed as the three arcuate rolling elements groups along the inner circumferential wall surface 40, the remaining three rolling elements 28*a*, 28*b*, 28*c* are pressed by the cam 52 into the respective first, second, and third gaps 56a, 56b, 56c radially outwardly (laterally) toward the inner circumferential wall surface 40 (see FIGS. 5 through 7). After the remaining three rolling elements 28a, 28b, 28c are pressed into the respective first, second, and third gaps 56a, 56b, 56c, the rolling elements 28 including the three rolling elements 28a, 28b, 28c are arranged as an annular array along the inner circumferential wall surface 40 with a circumferential clearance C formed between adjacent two of the rolling elements 28, i.e., the rolling elements 28 are held in a state capable of developing a keystone effect (see FIG. 7).

Specifically, the three rolling elements 28a, 28b, 28c are substantially simultaneously pressed into the respective first, second, and third gaps 56a, 56b, 56c by rotating the cam 52 in the direction indicated by the arrow A to cause the first through third pressing surfaces 50a through 50c contiguous to the respective first through third cam grooves 48a through 48c to push the three rolling elements 28a, 28b, 28c radially outwardly toward the respective first, second, and third gaps 56a, 56b, 56c, as shown in FIG. 5. The minimum distance d2 between any two of the first, second, and third gaps 56a, 56b, 56c and the diameter d1 of each of the rolling elements 28a, 28b, 28c are set such that d2<d1 as is conventional.

All the rolling elements 28, 28a through 28c loaded on the inner circumferential wall surface 40 are vertically held between the first flange 42 and the second flange 44, and prevented from being dislodgment from the inner circumferential wall surface 40 by the keystone effect.

Figure 8:
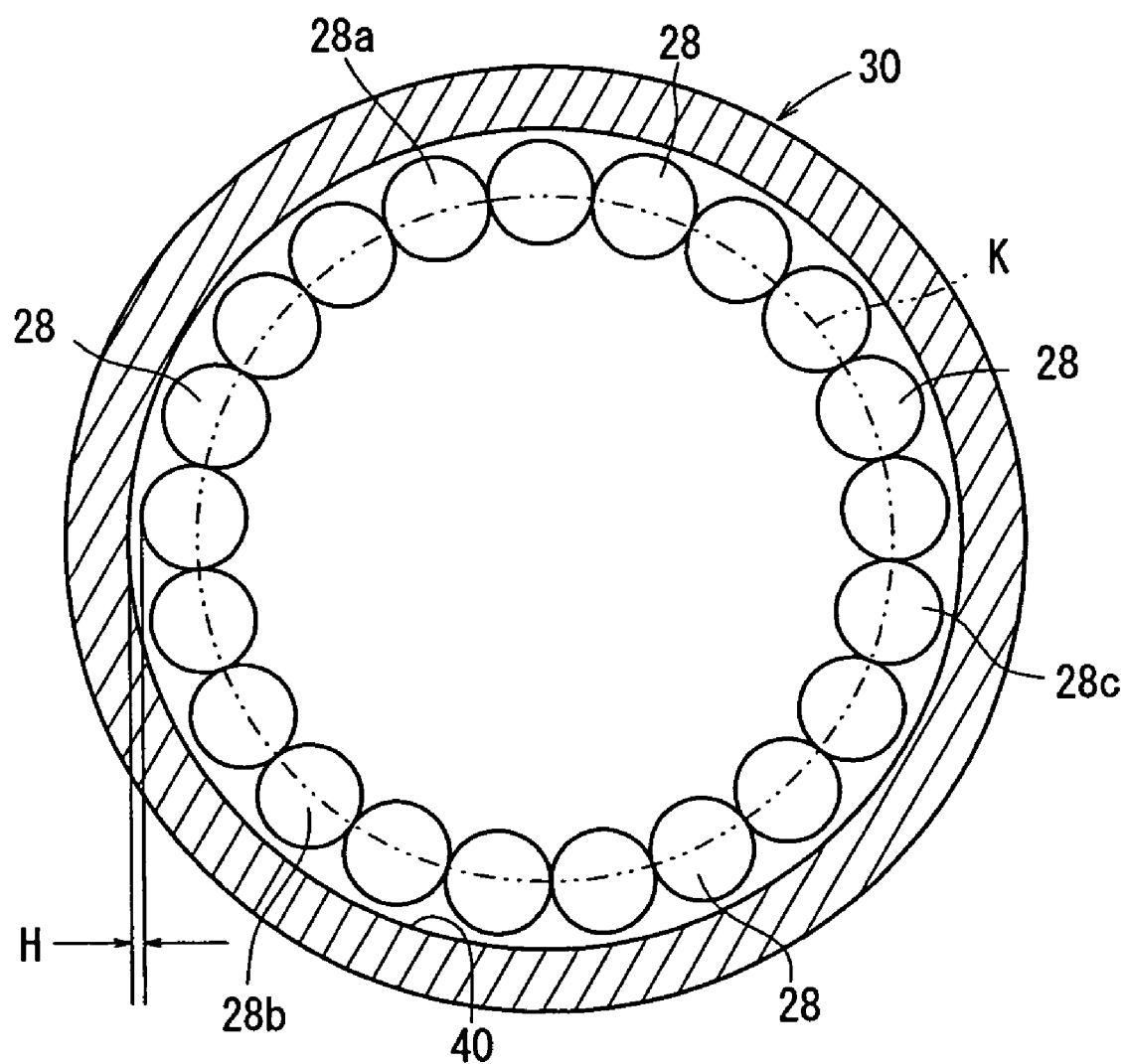
FIG. 8 is a transverse cross-sectional view showing the manner in which the rolling elements arrayed in the roller are spaced from the inner circumferential wall surface of the roller by a radial clearance H due to a keystone effect.

As shown in FIG. 8, when all the rolling elements 28, 28a through 28c are held as a circumferential array by the keystone effect, a radial clearance H is formed between the outer circumferential surfaces of the rolling elements 28, 28a through 28c and the inner circumferential wall surface 40. In FIG. 8, the two-dot-and-dash line K represents a hypothetical circle interconnecting the points of contact between adjacent ones of the rolling elements 28, 28a through 28c.

According to the first assembling process, the rolling elements 28 arranged along the inner circumferential wall surface 40 are divided into three rolling element groups (one rolling element group is made up of six rolling elements 28). Even though circumferential clearances C are formed between adjacent ones of the rolling elements 28 in the rolling element groups or the produced circumferential clearances C are irregular, the three rolling elements 28a through 28c can smoothly be pressed respectively into the first through third gaps 56a through 56c without deforming the rolling elements 28.

Figure 21:
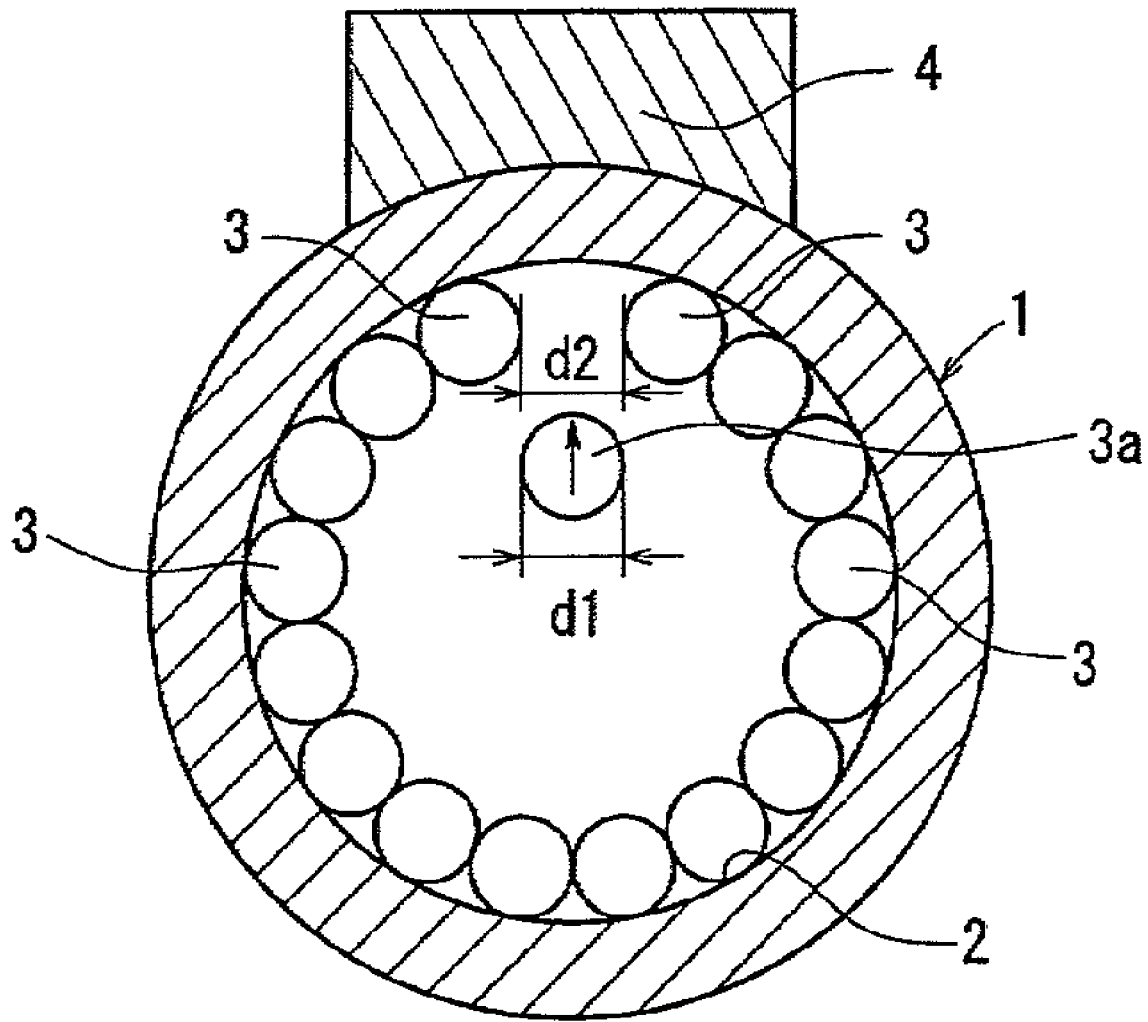
FIG. 21 is a transverse cross-sectional view illustrative of a process of pressing rolling elements onto the cylindrical inner circumferential surface of a roller of a conventional constant-velocity joint.

According to the conventional structure shown in FIG. 21, the rolling elements 3 except the final rolling element 3a are provided as a single rolling element group. If irregular clearances are formed between adjacent ones of the rolling elements 3 in the rolling element group, then the gap generated between the rolling elements on the ends of the rolling element group is reduced, and the actual interference becomes greater than the preset interference due to the clearances. When this happens, the final rolling element 3a may not be pressed into the gap. If the final rolling element 3a is forcibly pressed into the gap under an increased pressing load, then the final rolling element 3a or the rolling elements 3 already in the array may be deformed.

According to the first assembling process, however, since all the rolling elements except the final three rolling elements are divided into three rolling element groups, the number of rolling elements 28 making up each of the rolling element groups is reduced. Therefore, when the final three rolling elements are pressed into the gaps, a force easily acts to move adjacent ones of the rolling elements 28 in the rolling element groups toward each other, thereby minimizing the circumferential clearances C between the rolling elements 28.

Figure 9:
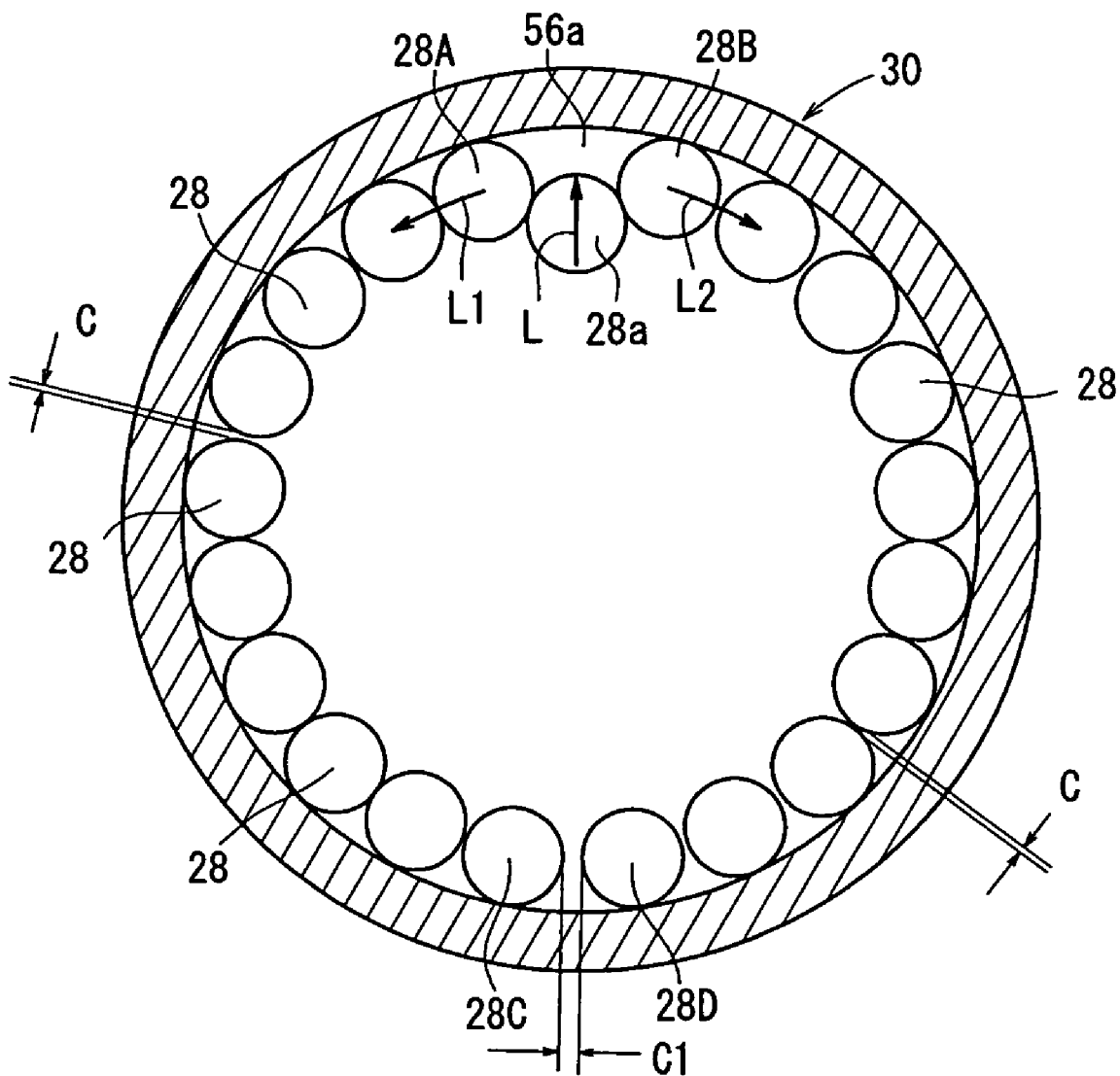
FIG. 9 is a transverse cross-sectional view showing the manner in which a pressing force acts when pressing a final rolling element into a gap according to a comparative assembling process.

For example, as shown in FIG. 9, when only a final single rolling element 28a is to be pressed into a gap 56a according to a comparative example, if a circumferential clearance C1 is formed between rolling elements 28C, 28D that are angularly spaced about 180° from the gap 56a, then a pressing force L applied to press the rolling element 28a into the gap 56a is divided into pressing forces L1, L2 by adjacent rolling elements 28A, 28B between which the gap 56a is defined, and the pressing forces L1, L2 are successively transmitted through the circumferentially arrayed rolling elements 28. It is difficult for the pressing forces L1, L2 to act between the rolling elements 28C, 28D that are positioned most remotely from the adjacent rolling elements 28A, 28B to eliminate or reduce the circumferential clearance C1.

Figure 10:
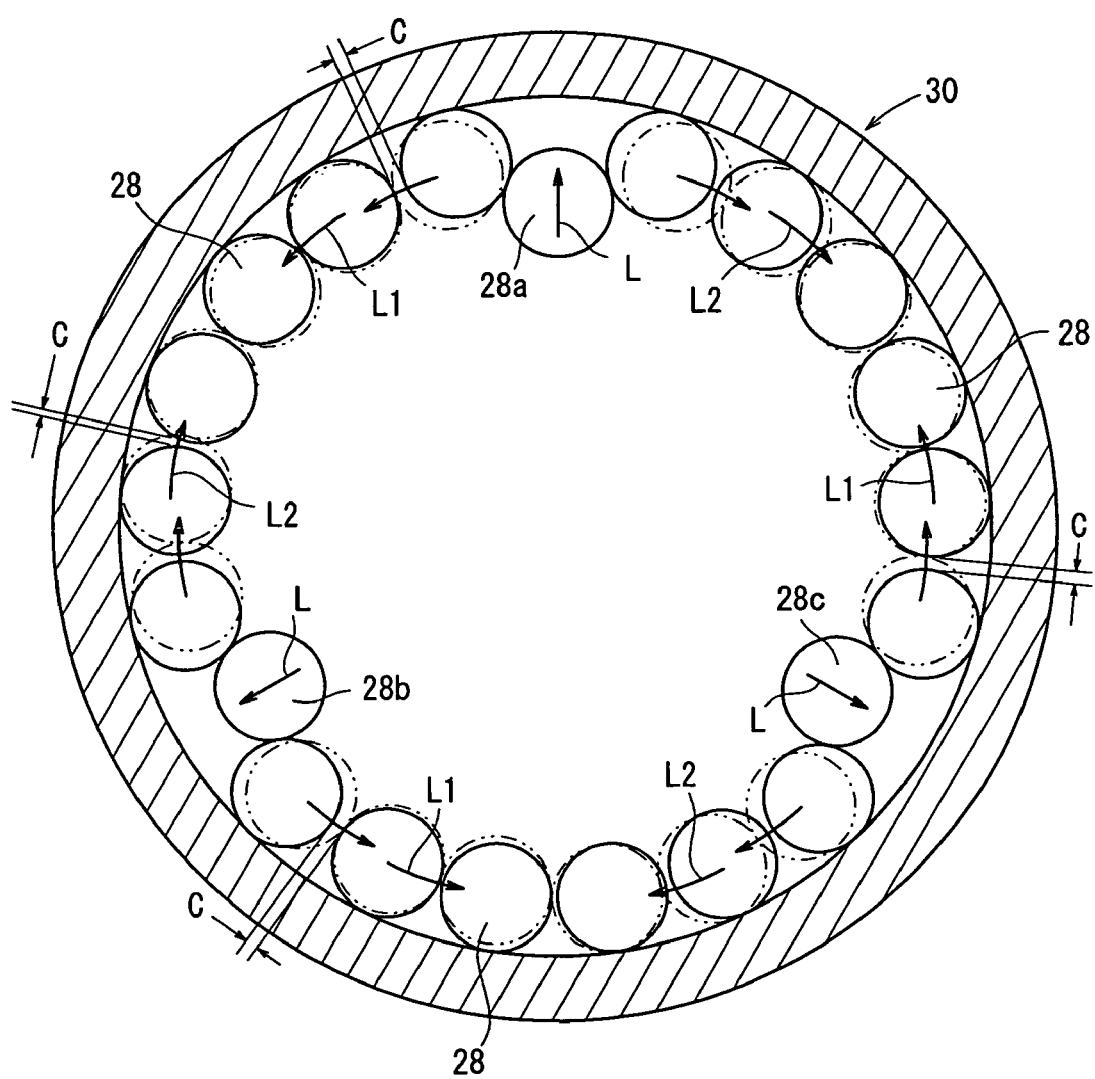
FIG. 10 is a transverse cross-sectional view showing the manner in which a pressing force acts when pressing three circumferentially scattered rolling elements into respective gaps according to a first assembling process of the embodiment of the present invention.

According to the first assembling process, as shown in FIG. 10, when the circumferentially scattered or spaced rolling elements 28a through 28c are to be pressed into the respective first through third gaps 56a, 56b, 56c, the number of rolling elements 28 in each of the rolling element groups between the first through third gaps 56a through 56c is smaller than number of rolling elements 28 in the rolling element group according to the comparative example and the pressing forces L1, L2 divided from the pressing forces L applied to the rolling elements 28a through 28c act toward each other, easily displacing adjacent ones of the rolling elements 28 already on the inner circumferential wall surface 40 toward each other, as indicated by the two-dot-and-dash lines in FIG. 10. Consequently, the circumferential clearances C formed between adjacent ones of the rolling elements 28 are easily eliminated or reduced, allowing the rolling elements 28a through 28c to be easily pressed into the respective first through third gaps 56a, 56b, 56c.

According to the first assembling process, therefore, even if circumferential clearances C are formed between adjacent ones of the rolling elements 28 in the rolling element groups or the produced circumferential clearances C are irregular, the actual interference can be made close to the preset interference by preventing the first through third gaps 56a, 56b, 56c defined between the rolling elements 28 on the ends of the three rolling element groups from being reduced.

According to the first assembling process, furthermore, the rolling elements 28 are supplied substantially simultaneously through the chutes and the final three rolling elements 28a through 28c are pressed substantially simultaneously into the respective gaps 56a through 56c. Therefore, the cycle time of the first assembling process is shorter than the cycle time of the conventional assembling process in which only one final rolling element is pressed into the gap.

According to the first assembling process, the pressing load applied to press the rolling elements does not concentrate on one location, but is scattered to a plurality of locations. Accordingly, the first assembling process does not need the holder 4 used in the conventional assembling process. Consequently, the number of parts making up the assembling apparatus is reduced, resulting in a reduction in the cost to manufacture the constant-velocity joint. According to the first assembling process, the rolling elements 28a through 28c that are finally pressed into place may be angularly positioned such that pressing loads applied to press them into the corresponding gaps can cancel each other.

According to the first assembling process, there are three final rolling elements 28a through 28c to be pressed into the respective gaps. However, two or more final rolling elements may be pressed into the respective gaps.

Figure 11:
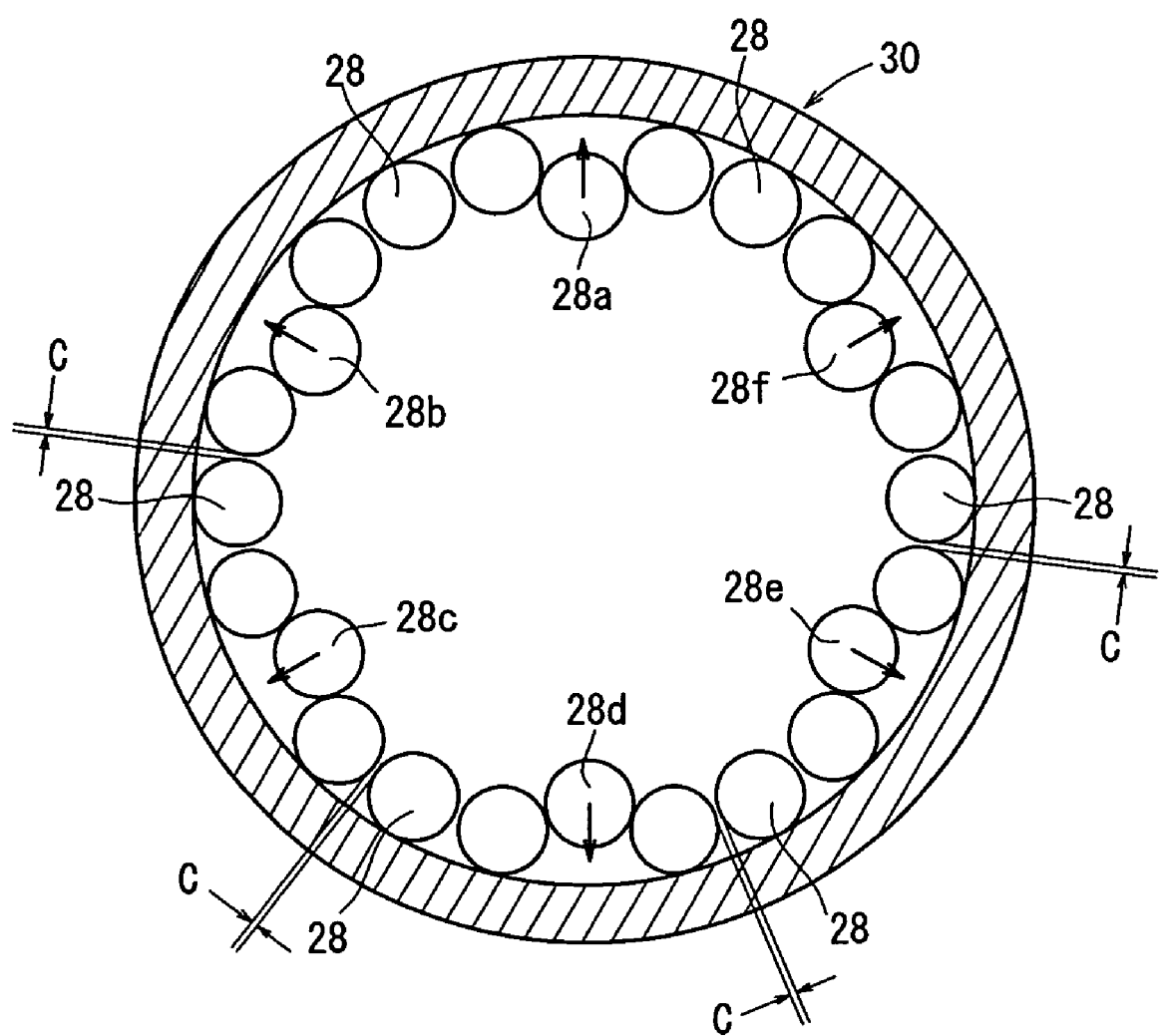
FIG. 11 is a transverse cross-sectional view showing the manner in which six circumferentially scattered rolling elements are pressed into respective gaps according to the first assembling process of the embodiment of the present invention.

For example, in FIG. 11, a total of 21 rolling elements 28 are to be loaded, and final six rolling elements 28a through 28f are to be pressed into the respective gaps. With this arrangement, the number of rolling elements in each of the rolling element groups is reduced (three rolling elements in FIG. 11), making it easy to eliminate circumferential clearances C. The number of cam grooves defined in the cam 52 is set depending on the number of final rolling elements to be pressed into the respective gaps.

Figure 12:
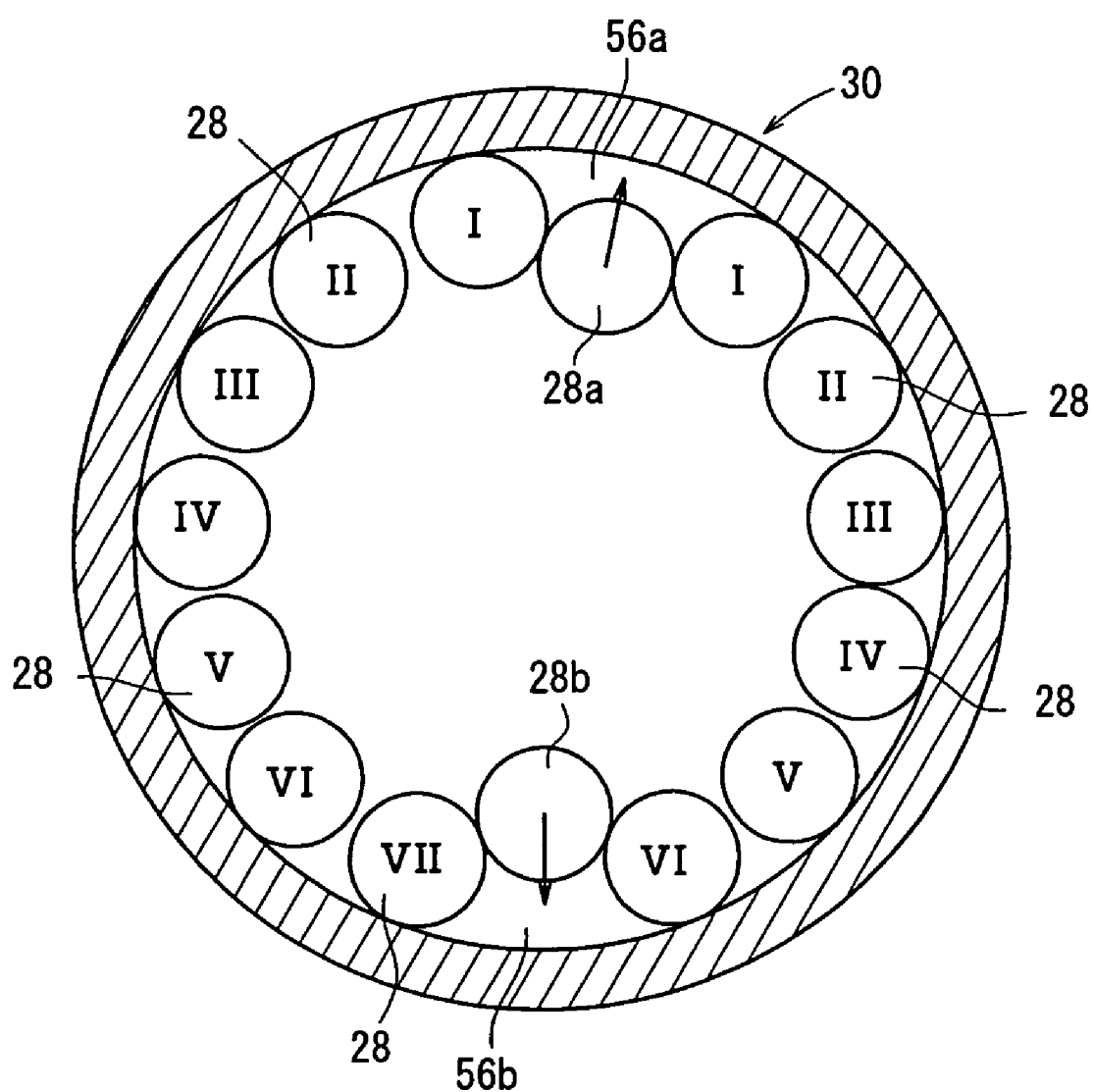
FIG. 12 is a transverse cross-sectional view showing the manner in which groups of rolling elements that are divided by two pressed rolling elements are not equal to each other according to the first assembling process of the embodiment of the present invention.

In FIG. 12, final two rolling elements 28a, 28b are pressed into the respective first and second gaps 56a, 56b, and the numbers of rolling elements in the rolling element groups between the first and second gaps 56a, 56b are different from each other, i.e., seven (I through VII) and six (I through VI).

Figure 13:
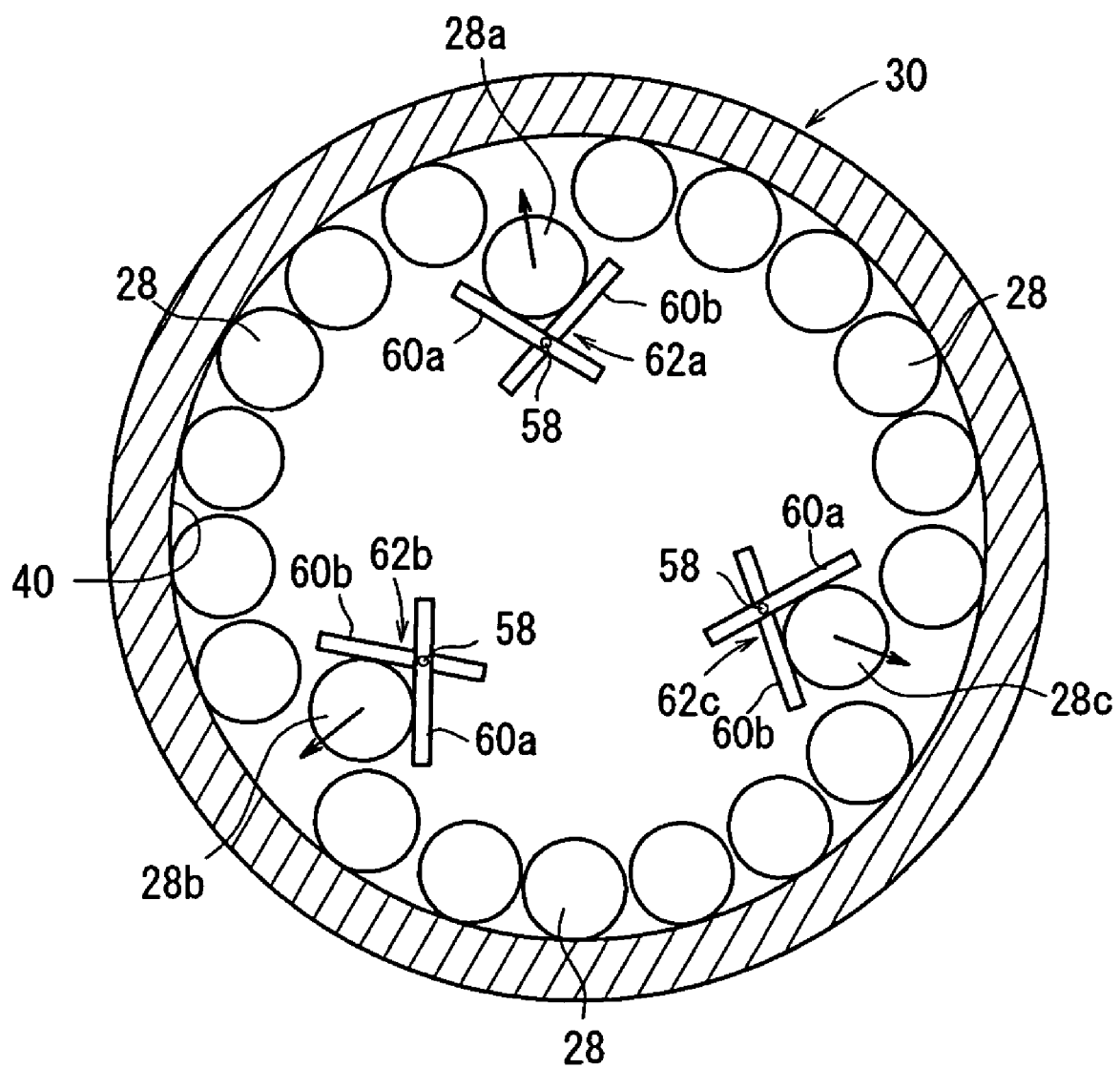
FIG. 13 is a transverse cross-sectional view showing the manner in which three final rolling elements are pressed into respective gaps by arms instead of the cam.
Figure 14:
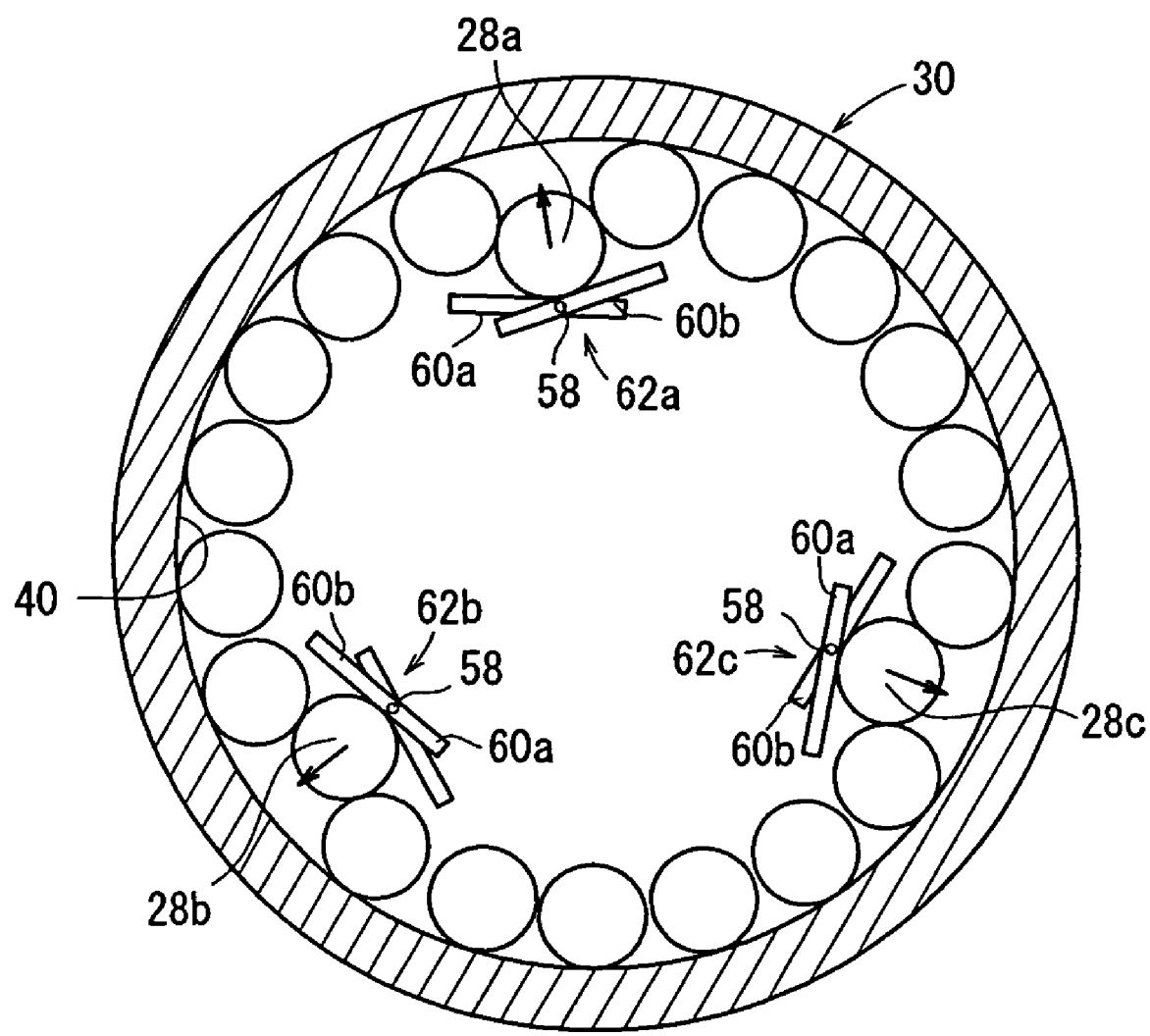
FIG. 14 is a transverse cross-sectional view showing the manner in which the three final rolling elements are pressed into the respective gaps by the arms instead of the cam.

As shown in FIGS. 13 and 14, the cam 52 may be replaced with a plurality of arms 62a through 62c each having a pair of gripping fingers 60a, 60b pivotally supported by a pin 58 for gripping and pressing the final three rolling elements 28a through 28c into the respective gaps. The arms 62a through 62c are coupled to a robot arm (not shown) that is displaceable along multiple axes including X, Y, and Z axes.

Roller assemblies, each comprising a plurality of rolling elements 28, 28a through 28c retained on the inner circumferential wall surface 40 of the roller 30, are mounted respectively on the trunnions 26a, 26b, 26c of the spider 24. Then, the spider 24 including the roller assemblies is inserted into the outer cup 12 such that the roller assemblies slidably engage in the respective guide grooves 18a, 18b, 18c, thereby constructing the constant-velocity joint 10.

Figure 15:
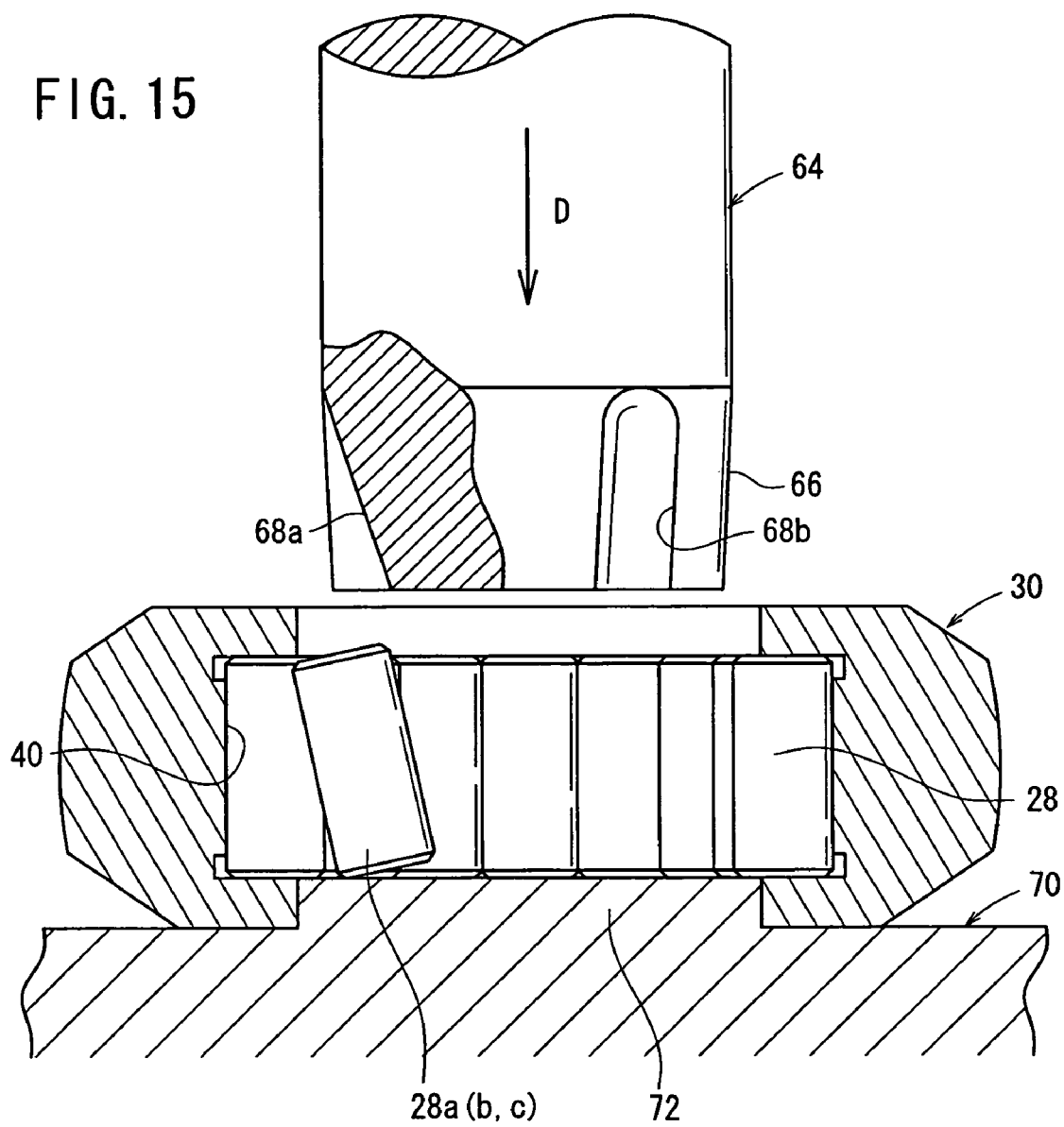
FIG. 15 is a vertical cross-sectional view illustrative of a second assembling process using a jig that is vertically movable along the axis of the inner circumferential wall surface of the roller.
Figure 16:
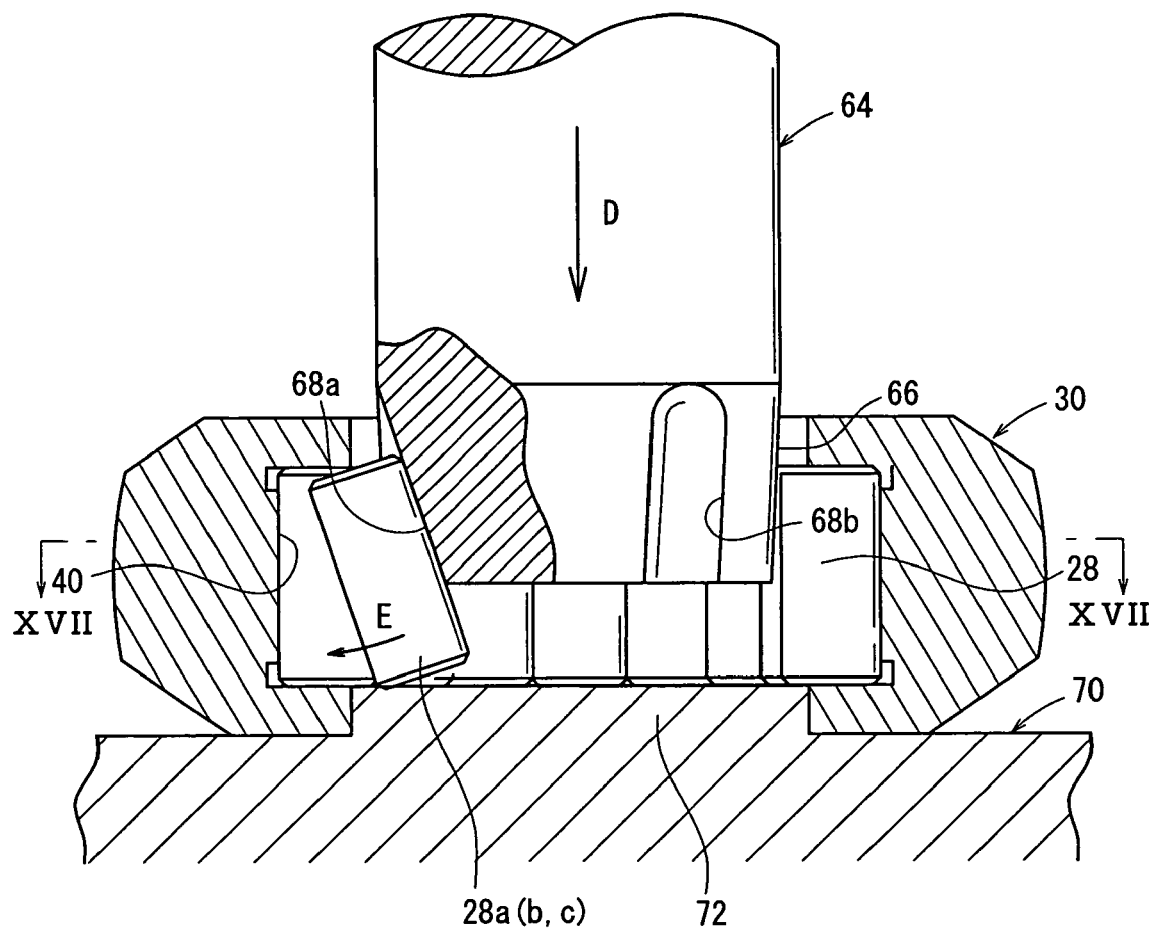
FIG. 16 is a vertical cross-sectional view showing the manner in which a rolling element is pressed by an engaging groove defined in the jig.
Figure 17:
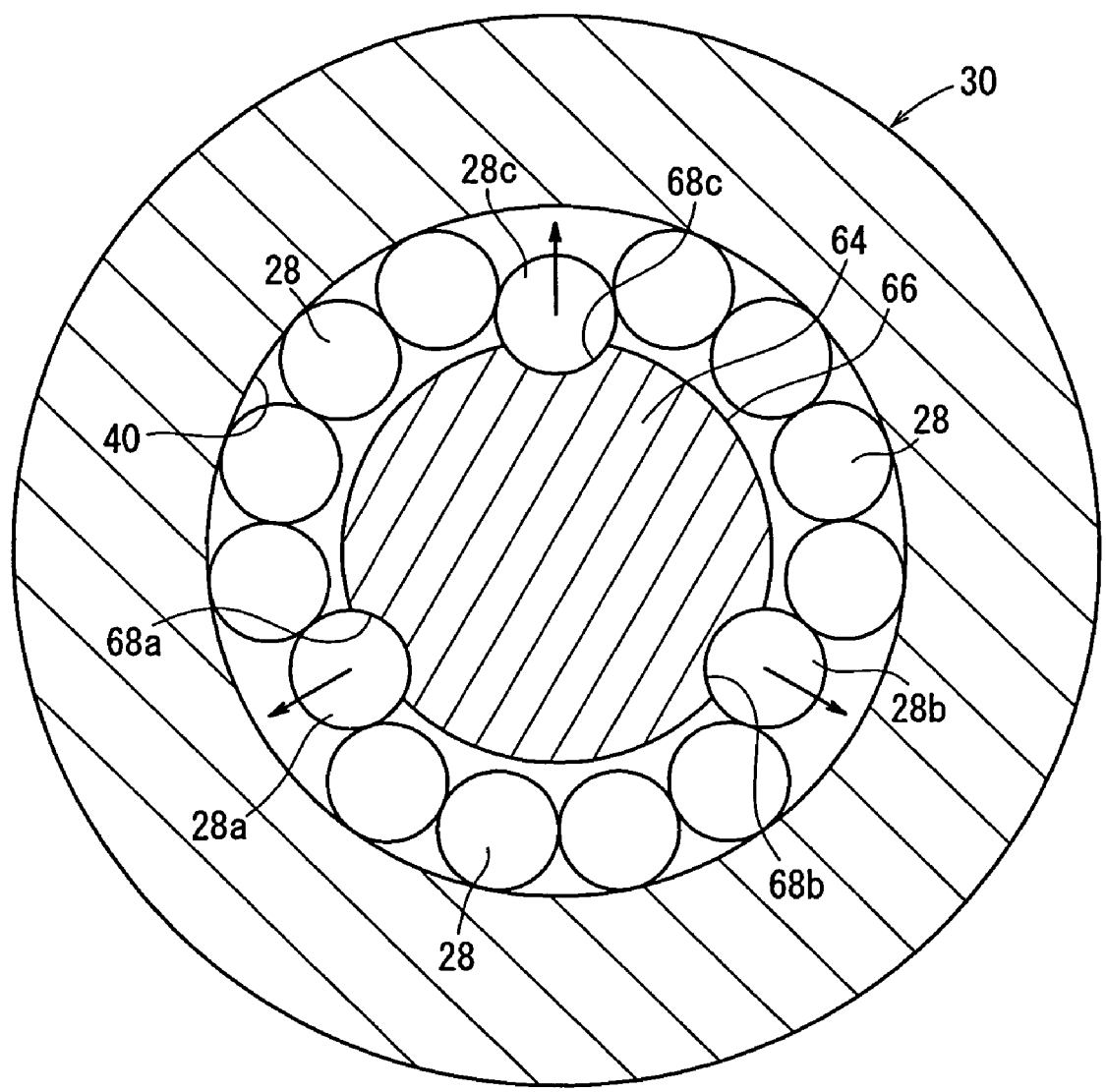
FIG. 17 is a transverse cross-sectional view taken along line XVII-XVII of FIG. 16.

A second assembling process of assembling the rolling elements 28 onto the inner circumferential wall surface 40 of the roller 30 is shown in FIGS. 15 through 17.

The second assembling process differs from the first assembling process in that the final three rolling elements 28a through 28c are pressed into the respective gaps using a jig 64 that is vertically movable along the axis of the inner circumferential wall surface 40 of the roller 30.

The jig 64 comprises a cylindrical body coupled to a vertically movable mechanism (not shown). The cylindrical body has a tapered surface 66 on a lower end portion thereof which is progressively smaller in diameter toward the tip end thereof. The gripping fingers 60a, 60b has three engaging grooves 68a through 68c of arcuate cross section which extend axially and are circumferentially spaced at equal angular intervals. As shown in FIG. 17, each of the engaging grooves 68a through 68c has an arcuate surface of arcuate transverse cross section complementary in shape to part of the outer circumferential surface of the rolling element 28. As shown in FIG. 15, the bottom surface of each of the engaging grooves 68a through 68c is slanted at an angle corresponding to the angle of the rolling elements 28, and the depth of each of the engaging grooves 68a through 68c progressively increases toward the tip end of the jig 64.

As shown in FIG. 15, the final three rolling elements 28a through 28c are placed obliquely at a certain angle on a land 72 of a holder 70 which holds the roller 30, and then the jig 64 is lowered in the direction indicated by the arrow D. As the jig 64 is continuously lowered, the final three rolling elements 28a through 28c engage respectively in the engaging grooves 68a through 68c defined in the tapered surface 66, and are pressed radially outwardly in the direction indicated by the arrow E into the respective first through third gaps 56a through 56c.

The second assembling process is advantageous in that the jig 64 increases the durability of the assembling apparatus. As the rolling elements 28a through 28c are obliquely loaded into the roller 30, the contact between the outer circumferential surfaces of the rolling elements 28a through 28c and the surfaces of the engaging grooves 68a through 68c of the jig 64 gradually changes from line-to-line contact to face-to-face contact. Therefore, the rolling elements 28a through 28c can smoothly be pressed into the respective gaps.

Figure 18:
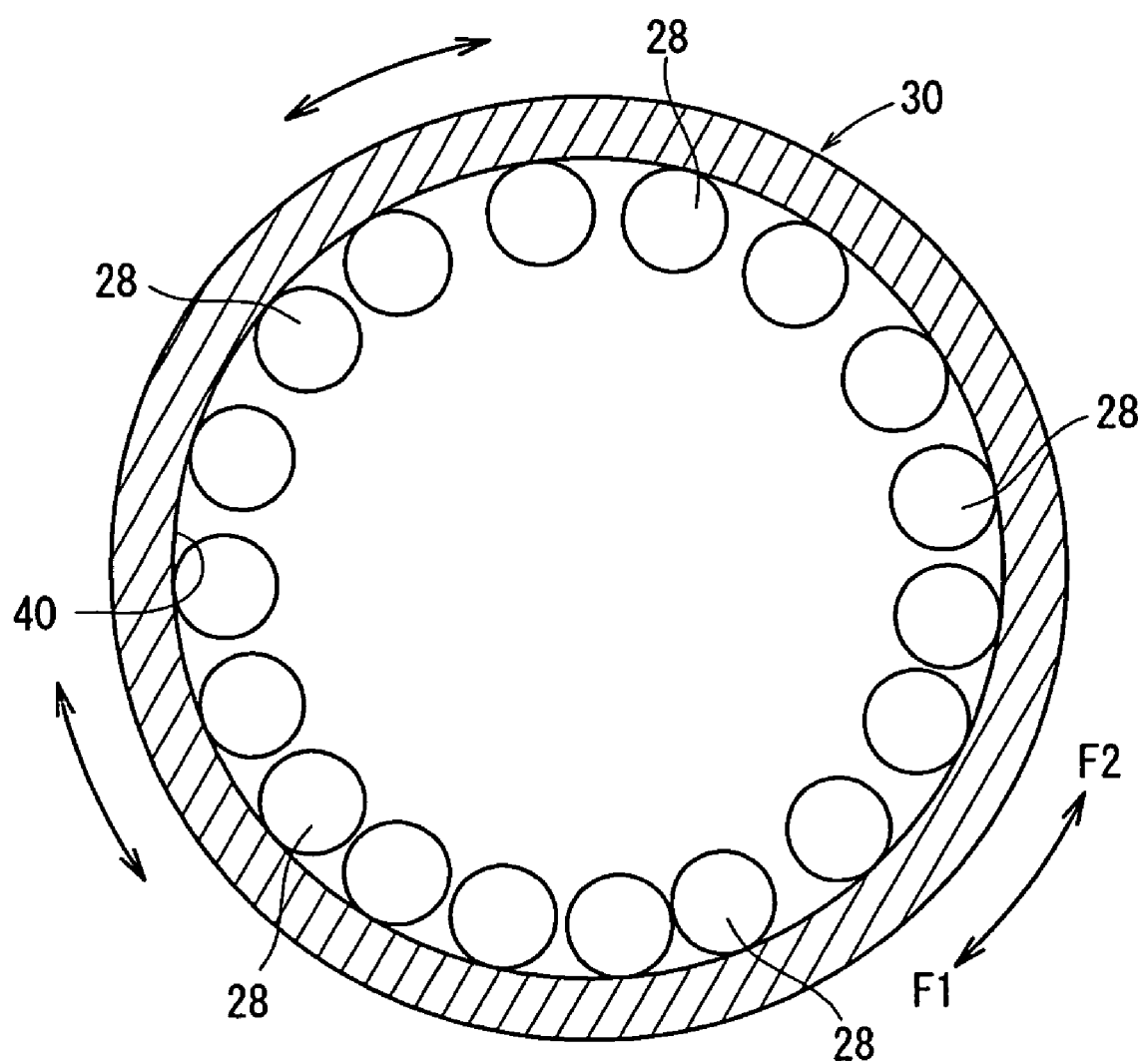
FIG. 18 is a vertical cross-sectional view illustrative of a third assembling process in which a plurality of rolling elements are arranged at random on the inner circumferential wall surface of the roller.
Figure 19:
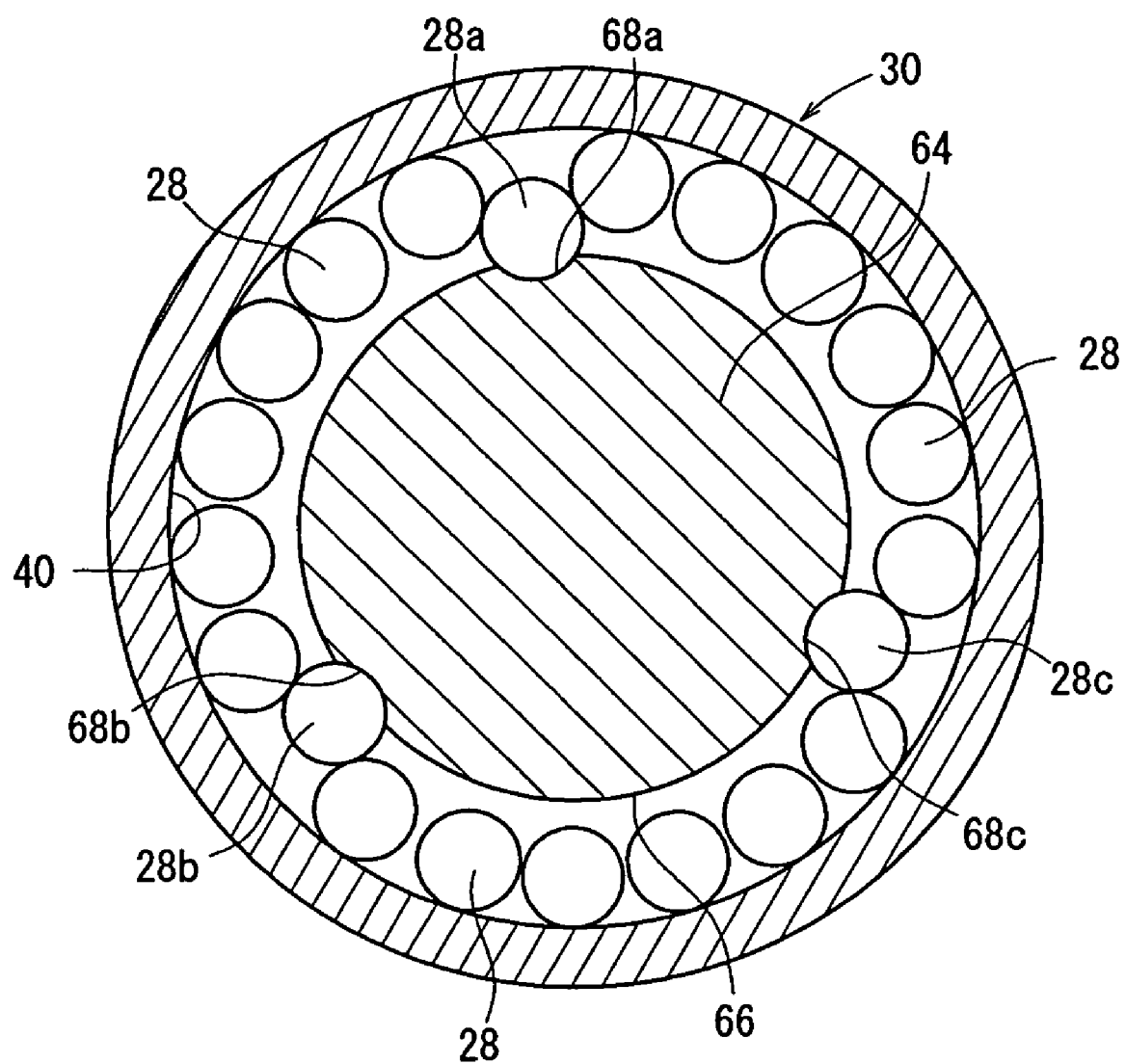
FIG. 19 is a transverse cross-sectional view showing the manner in which three final rolling elements are pressed into respective gaps with the jig shown in FIG. 15.

A third assembling process is illustrated in FIGS. 18 through 19.

According to the third assembling process, the rolling elements are not divided into three rolling element groups unlike the first assembling process. As shown in FIG. 18, all the rolling elements 28 except the final three rolling elements 28a through 28c are inserted at random altogether along the inner circumferential wall surface 40 of the roller 30, after which the roller 30 is vibrated small distances circumferentially in the directions indicated by the arrows F1, F2 by a vibrating mechanism (not shown). Then, as shown in FIG. 19, the final three rolling elements 28a through 28c are pressed into the corresponding gaps using the jig 64 (see FIG. 15), whereupon all the rolling elements 28, 28a through 28c are loaded on the inner circumferential wall surface 40.

According to the third assembling process, the cycle time thereof is reduced because all the rolling elements 28 except the final three rolling elements 28a through 28c are inserted at random altogether along the inner circumferential wall surface 40 of the roller 30. Furthermore, since no complex and special mechanical action is required to array all the rolling elements 28 except the final three rolling elements 28a through 28c along the inner circumferential wall surface 40, the rolling elements 28 can efficiently be assembled in place.

The rollers 30 assembled by either one of the first through third assembling processes are mounted on the respective trunnions 26a through 26c of the spider 24, and then assembled along the guide grooves 18a through 18c in the outer cup 12.

Figure 20:
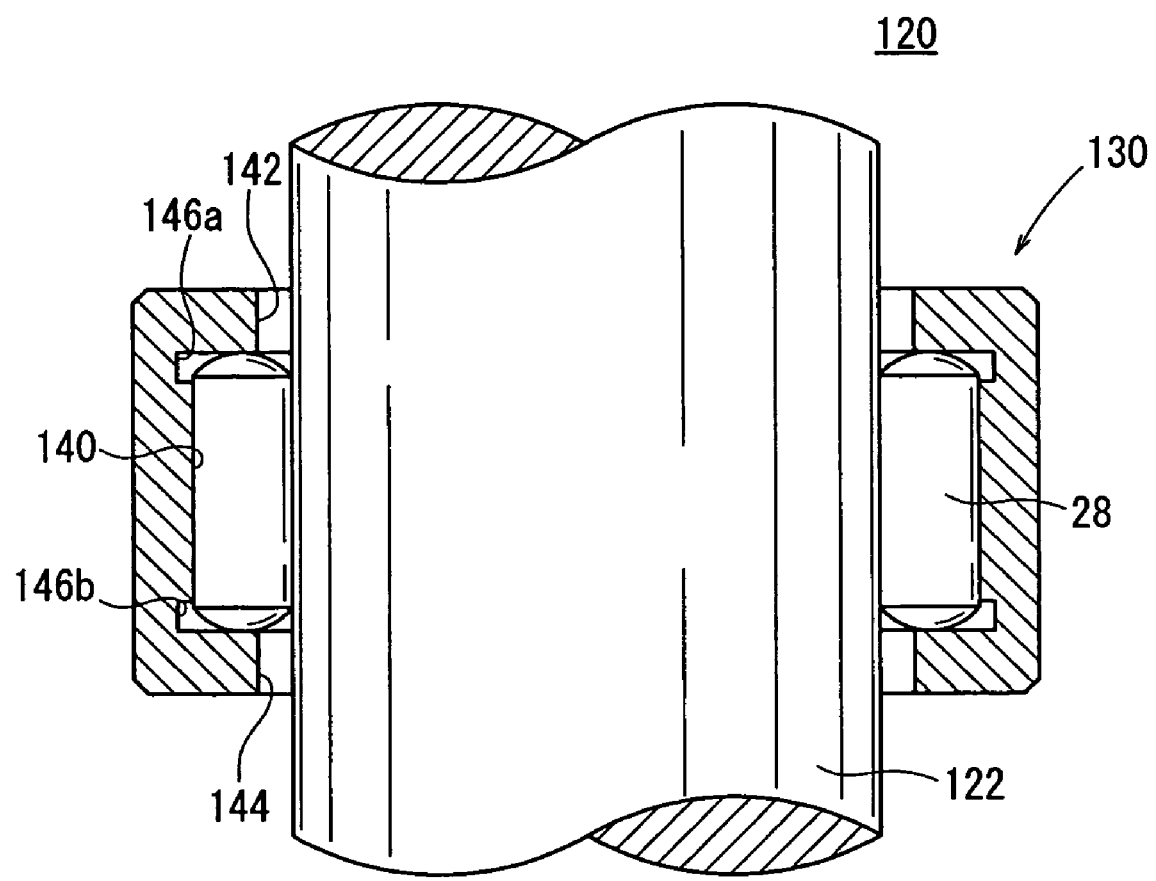
FIG. 20 is a vertical cross-sectional view showing the manner in which a keystone bearing manufactured by either one of the first through third assembling processes is installed on a shaft.

FIG. 20 shows a keystone bearing 120 manufactured by either one of the first through third assembling processes as it is applied to the manufacture of bearings. In FIG. 20, the keystone bearing 120 is shown as being assembled on a cylindrical shaft 122. Those parts of the keystone bearing 120 which are identical to those of the constant-velocity joint 10 are denoted by identical reference characters, and will not be described in detail below.

The keystone bearing 120 comprises an outer race 130 and a plurality of rolling elements 28 arrayed along an inner circumferential wall surface 140 of the outer race 130. The rolling elements 28 may comprise roll bearing elements such as needles, rolls, or the like.

The inner circumferential wall surface 140 has a constant diameter and functions as a rolling surface with which the rolling elements 28 are held in rolling engagement. The outer race 130 also has an annular first flange 142 integrally projecting radially inwardly a predetermined distance from an upper portion (an end) of the inner circumferential wall surface 140, and an annular second flange 144 integrally projecting radially inwardly a predetermined distance from a lower portion (another end) of the inner circumferential wall surface 140 and axially opposite to and spaced from the first flange 142.

The rolling elements 28 are mounted on the inner circumferential wall surface 140 of the outer race 130 and vertically held in position between the first flange 142 and the second flange 144.

Annular grooves 146a, 146b are defined at boundaries between the inner circumferential wall surface 140 and the first and second flanges 142, 144. The annular grooves 146a, 146b function as lubricant reservoirs for holding a lubricant such as a grease or the like when the inner circumferential wall surface 140 is coated with the lubricant.

The rolling elements 28 are disposed on the inner circumferential wall surface 140 substantially parallel to each other in the circumferential direction of the outer race 130. The rolling elements 28 are retained against dislodgment from the inner circumferential wall surface 140 by the first and second flanges 142, 144 projecting radially inwardly from the axially opposite ends of the inner circumferential wall surface 140. The rolling elements 28 have substantially the same diameter and substantially the same shape.

Either one of the first through third assembling processes described above with respect to the constant-velocity joint 10 is applied to manufacture the keystone bearing 120. Therefore, the rolling elements 28, 28*a* through 28*c* loaded on the inner circumferential wall surface 140 are vertically held in position between the first flange 142 and the second flange 144, and are prevented from being dislodged from the inner circumferential wall surface 140 by the keystone effect.

Advantages provided by the first through third assembling processes as they are applied to manufacture the keystone bearing 120 are the same as those described above with respect to the constant-velocity joint 10, and will not be described in detail below.

The invention claimed is:

1. A method of manufacturing a tripod constant-velocity joint having a tubular outer member coupled to an end of a transmission shaft and having a plurality of axially extending guide grooves defined in an inner circumferential surface thereof and spaced at predetermined intervals, a plurality of trunnions projecting respectively into said guide grooves, a ring-shaped roller engaging in each of said guide grooves and fitted over each of said trunnions, and a plurality of rolling elements rollingly interposed between each of said trunnions and said roller, said method comprising the steps of:

providing first and second flanges on axially spaced opposite ends of an inner circumferential wall surface of said roller, said first and second flanges projecting radially inwardly and holding said rolling elements therebetween; and arranging all rolling elements except a plurality of remaining rolling elements along said inner circumferential wall surface of said roller, and then simultaneously pressing said remaining rolling elements radially outwardly respectively into circumferentially spaced gaps between adjacent ones of the rolling elements arranged along said inner circumferential wall surface.

2. A method according to claim 1, wherein said remaining rolling elements are simultaneously pressed into said gaps by being inserted into respective cam grooves in a cam and thereafter rotating said cam to cause respective pressing surfaces to simultaneously press said remaining rolling elements radially outwardly respectively into said gaps.

3. A method according to claim 1, wherein said remaining rolling elements are simultaneously pressed into said gaps by respective arms each having a pair of gripping fingers pivotally supported by a pin.

4. A method according to claim 1, wherein said remaining rolling elements are simultaneously pressed into said gaps by a jig which is displaceable along the axis of said inner circumferential wall surface.

5. A method according to claim 1, wherein when all the rolling elements except the plurality of remaining rolling elements are arranged along said inner circumferential wall surface, irregular circumferential clearances are formed circumferentially between adjacent ones of said rolling elements.

6. A method according to claim 1, wherein said remaining rolling elements are simultaneously pressed into said gaps while being spaced circumferentially at equal angular intervals.

* * * * *